(12) United States Patent
Hwang

(10) Patent No.: US 11,314,363 B2
(45) Date of Patent: Apr. 26, 2022

(54) TOUCH SENSOR AND DISPLAY DEVICE

(71) Applicant: Samsung Display Co., Ltd., Yongin-si (KR)

(72) Inventor: Seong Mo Hwang, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 72 days.

(21) Appl. No.: 16/594,777

(22) Filed: Oct. 7, 2019

(65) Prior Publication Data

US 2020/0150826 A1 May 14, 2020

(30) Foreign Application Priority Data

Nov. 9, 2018 (KR) .................. 10-2018-0137386

(51) Int. Cl.
*G06F 3/044* (2006.01)
*G06F 3/041* (2006.01)

(52) U.S. Cl.
CPC ........ *G06F 3/0446* (2019.05); *G06F 3/04144* (2019.05); *G06F 2203/04106* (2013.01); *G06F 2203/04111* (2013.01); *G06F 2203/04112* (2013.01)

(58) Field of Classification Search
CPC .. G06F 3/0446; G06F 3/04144; G06F 3/0412; G06F 3/044; G06F 2203/04106; G06F 2203/04111; G06F 2203/04112; G06F 2203/04105
See application file for complete search history.

(56) References Cited

U.S. PATENT DOCUMENTS

| 7,663,607 B2 | 2/2010 | Hotelling et al. |
| 2006/0097991 A1 | 5/2006 | Hotelling et al. |
| 2016/0147352 A1 | 5/2016 | Filiz et al. |
| 2016/0195955 A1* | 7/2016 | Picciotto ............. G06F 3/04144 345/174 |

(Continued)

FOREIGN PATENT DOCUMENTS

| JP | 2015-130083 | 7/2015 |
| KR | 10-137304 | 2/1998 |

(Continued)

*Primary Examiner* — Alexander Eisen
*Assistant Examiner* — Kebede T Teshome
(74) *Attorney, Agent, or Firm* — H.C. Park & Associates, PLC

(57) ABSTRACT

A touch sensor includes: a base layer; a first electrode member including first touch electrodes arranged on the base layer along a first direction and electrically connected in the first direction, the first touch electrodes including first openings; a second electrode member including second touch electrodes arranged on the base layer along a second direction intersecting the first direction and electrically connected in the second direction, the second touch electrodes including second openings; a first strain gauge including first resistance lines disposed in the first openings and electrically connected in the first direction; and a second strain gauge including second resistance lines, which are disposed in the second openings and electrically connected in the second direction, wherein the first electrode member may be insulated from the second electrode member, and wherein the first strain gauge may be insulated from the second strain gauge.

20 Claims, 36 Drawing Sheets

(56) References Cited

U.S. PATENT DOCUMENTS

2016/0357331 A1* 12/2016 Kano ................ G06F 3/0416
2017/0285799 A1* 10/2017 Iuchi ................ G06F 3/0446
2017/0285864 A1* 10/2017 Pedder .............. H01L 27/323
2018/0061899 A1*  3/2018 Oh .................... G06F 3/0412

FOREIGN PATENT DOCUMENTS

| KR | 10-1233479 | 2/2013 |
| KR | 2018-0000665 | 1/2018 |

* cited by examiner

TOUCH SENSOR AND DISPLAY DEVICE

CROSS REFERENCE TO RELATED APPLICATION

This application claims priority from and the benefit of Korean Patent Application No. 10-2018-0137386, filed on Nov. 9, 2018, which is hereby incorporated by reference for all purposes as if fully set forth herein.

BACKGROUND

Field

Exemplary implementations of the invention relate generally to a touch sensor and a display device.

Discussion of the Background

Electronic devices such as smart phones, digital cameras, laptop computers, navigation devices, or smart televisions generally include a display device for displaying an image to a user. The display device includes a display panel for generating and displaying an image and various input devices.

Recently, touch sensors for recognizing touch input have been employed in display devices such as smartphones or tablet personal computers (PCs) and are increasingly replacing existing physical input devices such as keypads because of their highly convenient touch method.

Research has been conducted with regard to ways to replace the existing physical buttons of a display device using touch sensors capable of detecting the location of touch input as well as using pressure sensors capable of detecting the magnitude of pressure.

The above information disclosed in this Background section is only for understanding of the background of the inventive concepts, and, therefore, it may contain information that does not constitute prior art.

SUMMARY

Devices constructed according to exemplary implementations of the invention are directed to a touch sensor capable of detecting pressure.

Additional features of the inventive concepts will be set forth in the description which follows, and in part will be apparent from the description, or may be learned by practice of the inventive concepts.

According to one or more embodiments of the invention, a touch sensor includes: a base layer; a first electrode member including first touch electrodes arranged on the base layer along a first direction and electrically connected to one another in the first direction, the first touch electrodes including first openings; a second electrode member including second touch electrodes arranged on the base layer along a second direction intersecting the first direction and electrically connected to one another in the second direction, the second touch electrodes including second openings; a first strain gauge including first resistance lines disposed in the first openings and electrically connected to one another in the first direction; and a second strain gauge including second resistance lines, which are disposed in the second openings and electrically connected to one another in the second direction, wherein the first electrode member may be insulated from the second electrode member, and wherein the first strain gauge may be insulated from the second strain gauge.

The first electrode member may further include first connectors respectively connecting pairs of adjacent first touch electrodes in the first direction, wherein the second electrode member may further include second connectors respectively connecting pairs of adjacent second touch electrodes in the second direction, and wherein the first connectors and the second connectors may be disposed in different layers.

The first strain gauge may further include first connecting lines respectively connecting pairs of adjacent first resistance lines in the first direction, wherein the second strain gauge may further include second connecting lines respectively connecting pairs of adjacent second resistance lines in the second direction and insulated from the first connecting lines, and wherein the first connecting lines and the second connecting lines may be disposed in different layers.

The second connectors may be disposed in the same layer as the second connecting lines.

The first touch electrodes and the second touch electrodes may include a metal mesh structure.

The touch sensor may further include: a first insulating layer disposed between the first connectors and the second connectors; and a second insulating layer disposed between the first connecting lines and the second connecting lines.

The touch sensor may further include: a temperature compensation module disposed between the base layer and the first strain gauge, the temperature compensation module including a first temperature compensation pattern and a second temperature compensation pattern, wherein the first temperature compensation pattern may be insulated from the second temperature compensation pattern.

In a plan view, the first temperature compensation pattern may overlap with the first strain gauge and include first temperature compensation resistance lines having the same shape as the overlapping first resistance lines, and the second temperature compensation pattern may overlap with the second strain gauge and include second temperature compensation resistance lines having the same shape as the overlapping second resistance lines.

The touch sensor may be configured to: detect a location of touch input based on mutual capacitance variations between the first touch electrodes and the second touch electrodes generated in response to the touch input and detect a pressure and the location of the touch input based on resistance variations in the first and second strain gauges generated in response to the touch input.

The touch sensor may further include: a first Wheatstone bridge circuit module electrically connected to the first strain gauge; and a second Wheatstone bridge circuit module electrically connected to the second strain gauge.

The first Wheatstone bridge circuit module may include: a first output node; a second output node; a first node to which a driving voltage is applied; and a second node which is connected to a ground source, wherein the second Wheatstone bridge circuit module may include: a third output node; a fourth output node; a third node to which a driving voltage is applied; and a fourth node which is connected to the ground source, wherein the first strain gauge may be electrically connected between the first node and the first output node, and wherein the second strain gauge may be electrically connected between the third node and the third output node.

The touch sensor may further include: a temperature compensation module including: first temperature compensation pattern overlapping the first strain gauge; and second temperature compensation pattern overlapping the second strain gauge; a first Wheatstone bridge circuit module including: a first output node; a second output node; a first node to which a driving voltage is applied; and a second node which is connected to a ground source; and a second Wheatstone bridge circuit module including: a third output node; a fourth output node; a third node to which a driving voltage is applied; and a fourth node which is connected to the ground source, wherein the first strain gauge may be electrically connected between the first node and the first output node, wherein the second strain gauge may be electrically connected between the third node and the third output node, wherein the first temperature compensation pattern may be electrically connected between the second node and the first output node, and wherein first temperature compensation pattern may be electrically connected between the fourth node and the third output node.

When the touch input is yet to be applied, a resistance of the first temperature compensation pattern may be the same as a resistance of the first strain gauge, and a resistance of the second temperature compensation pattern may be the same as a resistance of the second strain gauge.

According to one or more embodiments of the invention, a first base layer; a first electrode member including first touch electrodes arranged on the first base layer along a first direction and electrically connected to one another in the first direction, the first touch electrodes including first openings; a second electrode member including second touch electrodes arranged on the first base layer along a second direction intersecting the first direction and electrically connected to one another in the second direction, the second touch electrode including second openings; a first strain gauge including first resistance lines disposed in the first openings and electrically connected to one another in the first direction; and a first temperature compensation pattern disposed between the first base layer and the first strain gauge, wherein in a plan view, the first temperature compensation pattern overlaps with the first strain gauge and wherein the first temperature compensation pattern is formed of the same material as the first strain gauge.

The touch sensor may further include: a second base layer disposed between the first strain gauge and the first temperature compensation pattern, wherein the first temperature compensation pattern may be disposed between the first and second base layers.

The touch sensor may further include: a second strain gauge including second resistance lines, which are disposed in the second openings and electrically connected to one another in the second direction; and a second temperature compensation pattern disposed between the first base layer and the second strain gauge, wherein the second strain gauge may be insulated from the first strain gauge, and wherein the second temperature compensation pattern may be insulated from the first temperature compensation pattern.

The touch sensor may further include: an insulating layer disposed between the first and second temperature compensation patterns.

According to one or more embodiments of the invention, a display device including: a base substrate; a light-emitting element disposed on the base substrate; a thin-film encapsulation layer disposed on the light-emitting element; first touch electrodes disposed on the thin-film encapsulation layer and electrically connected to one another along a first direction, the first touch electrodes including first openings; second touch electrodes disposed on the thin-film encapsulation layer and electrically connected to one another along a second direction intersecting the first direction, the second touch electrodes including second openings; first resistance lines disposed in the first openings and electrically connected to one another in the first direction; and second resistance lines disposed in the second openings and electrically connected to one another in the second direction, wherein the first touch electrodes may be insulated from the second touch electrodes, and wherein the first resistance lines may be insulated from the second resistance lines.

The thin-film encapsulation layer may include a first inorganic film, an organic film disposed on the first inorganic film, and a second inorganic film disposed on the organic film, and wherein the first touch electrodes, the second touch electrodes, the first resistance lines, and the second resistance lines may be disposed on the second inorganic film.

The display device may further include: a temperature compensation module disposed between the thin-film encapsulation layer and the first resistance lines, the temperature compensation module including: first temperature compensation patterns having the same shape as the first resistance lines; and second temperature compensation patterns having the same shape as the second resistance lines, wherein the first and second temperature compensation patterns may be formed of the same material as the first resistance lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
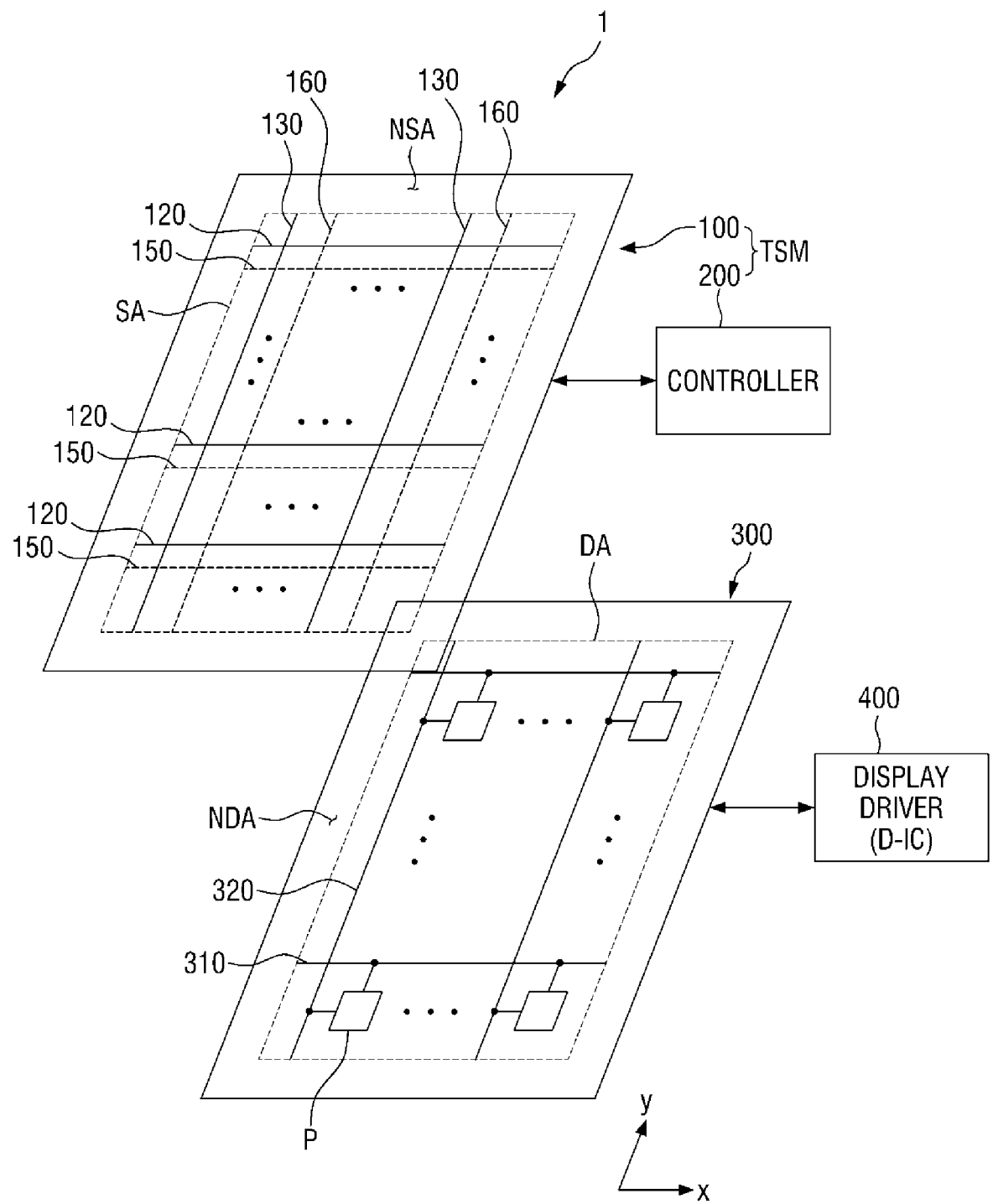
FIG. 1 is a schematic view of a display device according to an exemplary embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is to generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the first direction x and the second direction y are not limited to three axes of a rectangular coordinate system, such as the x and y-axes, and may be interpreted in a broader sense. For example, the first direction x and the second direction y may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
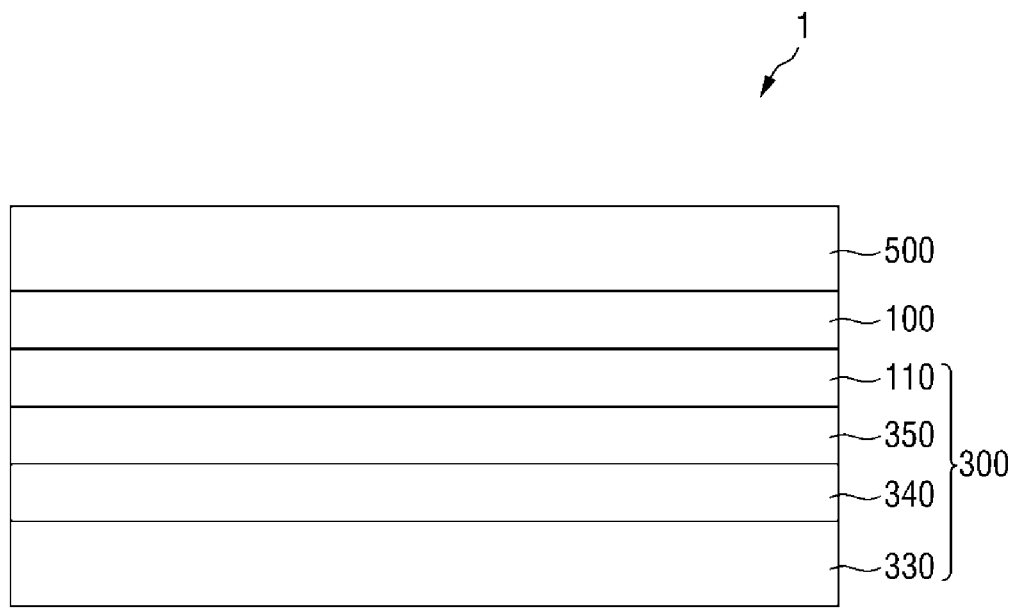
FIG. 2 is a partial cross-sectional view of the display device of FIG. 1.
Figure 3:
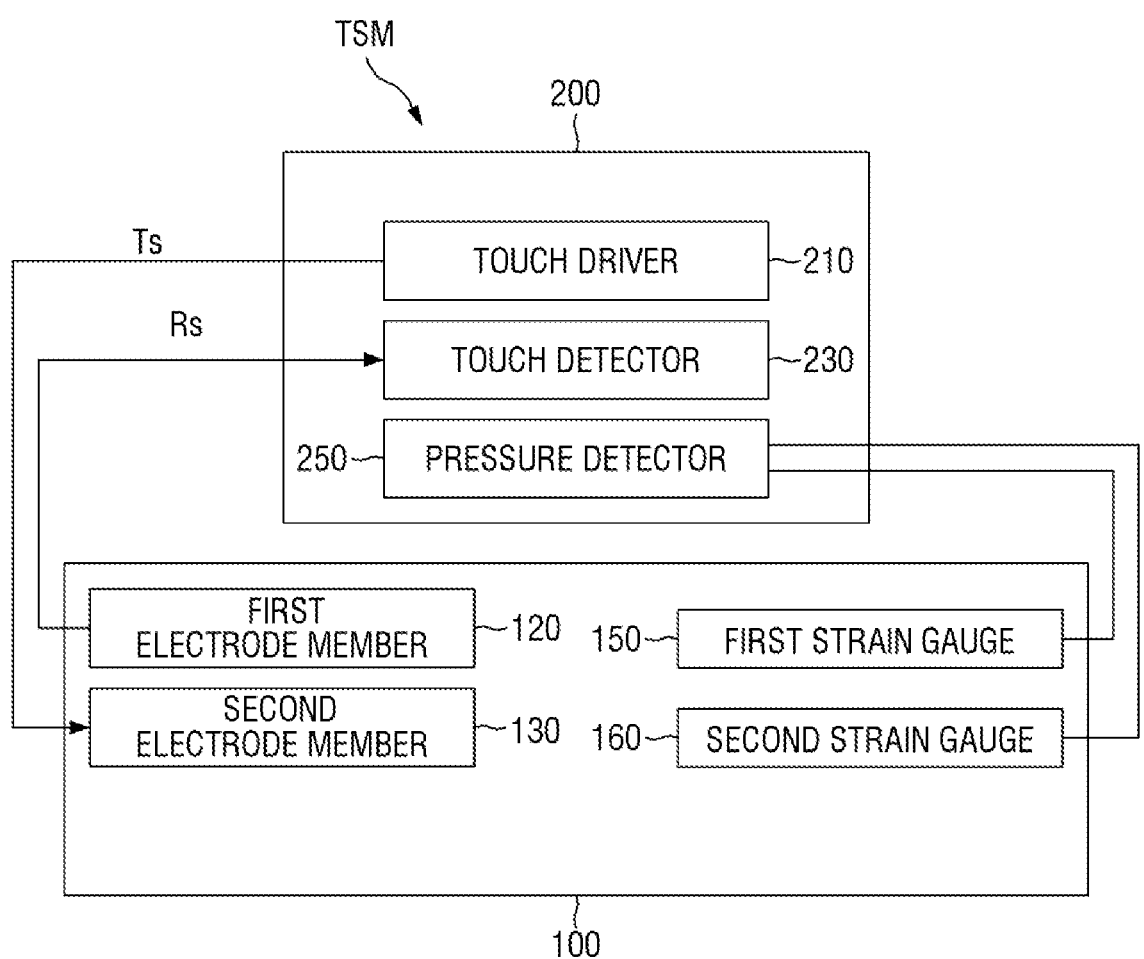
FIG. 3 is a block diagram of a touch sensor of FIG. 1.

FIG. 1 is a schematic view of a display device according to an exemplary embodiment of the present disclosure. FIG. 2 is a partial cross-sectional view of the display device of FIG. 1. FIG. 3 is a block diagram of a touch sensor of FIG. 1.

Referring to FIGS. 1, 2, and 3, a display device 1 includes a touch sensor TSM and a display panel 300 and further includes a panel driver 400. The touch sensor TSM includes a sensor module 100 and a controller 200.

FIG. 1 illustrates that the sensor module 100 and the display panel 300 are separate from each other, but the present disclosure is not limited thereto. In another example, the sensor module 100 and the display panel 300 may be formed in one integral body with each other.

The display panel 300 includes a display area DA and a non-display NDA surrounding at least part of the display panel DA. The display panel 300 may include a circuit driving layer 340 disposed on a base substrate 330 and a light-emitting element 350 disposed on the circuit driving layer 340. The circuit driving layer 340 may include scan lines 310 and data lines 320 for driving the light-emitting element 350 and a plurality of thin-film transistors. In the display area DA of the circuit driving layer 340, the scan lines 310 and the data lines 320, which are connected to a plurality of pixels P, may be provided. In the non-display area NDA of the circuit driving layer 340, wires for providing various driving signals and/or driving voltages for driving the pixels P may be provided.

The type of the display panel 300 is not particularly limited. For example, the display panel 300 may be a luminous display panel such as an organic light-emitting diode (OLED) display panel, a quantum dot light-emitting diode (QLED) display panel, a micro light-emitting diode (mLED) display panel, or a nano light-emitting diode (nano-LED) display panel. In another example, the display panel 300 may be a non-luminous display panel such as a liquid crystal display (LCD) panel, an electrophoretic display (EPD) panel, or an electrowetting display (EWD) panel. In a case where the display panel 300 is a non-luminous display panel, the display device 1 may further include a backlight unit for supplying light to the display panel 300. For convenience, an example in which the display panel 300 is an OLED display panel will hereinafter be described.

The panel driver 400 is electrically connected to the display panel 300 to provide signals necessary for driving the display panel 300. For example, the panel driver 400 may include at least one of a scan driver for providing scan signals to the scan lines 310, a data driver for providing data signals to the data lines 320, and a timing controller for driving the scan driver and the data driver. The scan driver, the data driver, and/or the timing controller may be integrated into a single display integrated circuit (D-IC), but the present disclosure is not limited thereto. In another example, at least one of the scan driver, the data driver, and the timing controller may be integrated or mounted on the display panel 300.

The sensor module 100 may be provided in at least one area of the display panel 300. For example, the sensor module 100 may be provided on at least one surface of the display panel 300 to overlap with the display panel 300. For example, the sensor module 100 may be disposed on one of the surfaces (e.g., the top surface) of the display panel 300 in a direction in which images are emitted. In another example, the sensor module 100 may be formed directly on at least one surface of the display panel 300 or may be formed inside the display panel 300. For example, the sensor module 100 may be formed directly on the outer surface of an upper or lower substrate (or a thin-film encapsulation (TFE) layer) of the display panel 300 (e.g., on the top surface of the upper substrate or on the bottom surface of the lower substrate) or may be formed directly on an inner surface of the upper or lower substrate of the display panel 300 (e.g., on the bottom surface of the upper substrate or on the top surface of the lower substrate).

The sensor module 100 includes a sensing area SA in which touch input can be detected and a peripheral area NSA which surrounds at least part of the sensing area SA. The sensing area SA may be disposed to correspond to the display area DA of the display panel 300, and the peripheral area NSA may be disposed to correspond to the non-display area NDA of the display panel 300. For example, the sensing area SA of the sensor module 100 may overlap with the display are DA of the display panel 300, and the peripheral area NSA of the sensor module 100 may overlap with the non-display area NDA of the display panel 300.

In the sensing area SA of the sensor module 100, a plurality of first electrode members 120 and a plurality of second electrode members 130 for detecting touch input may be provided.

The first electrode members 120 may extend in a first direction x and may be spaced apart from one another in a second direction y that intersects the first direction x. That is, the first electrode members 120, which extend in the first direction x, may be spaced apart from one another in the second direction y to form electrode rows.

The second electrode members 130 may extend in the second direction y and may be spaced apart from one another in the first direction x. The second electrode members 130 may be spaced apart from the first electrode members 120 and may be insulated from the first electrode members 120.

Figure 4:
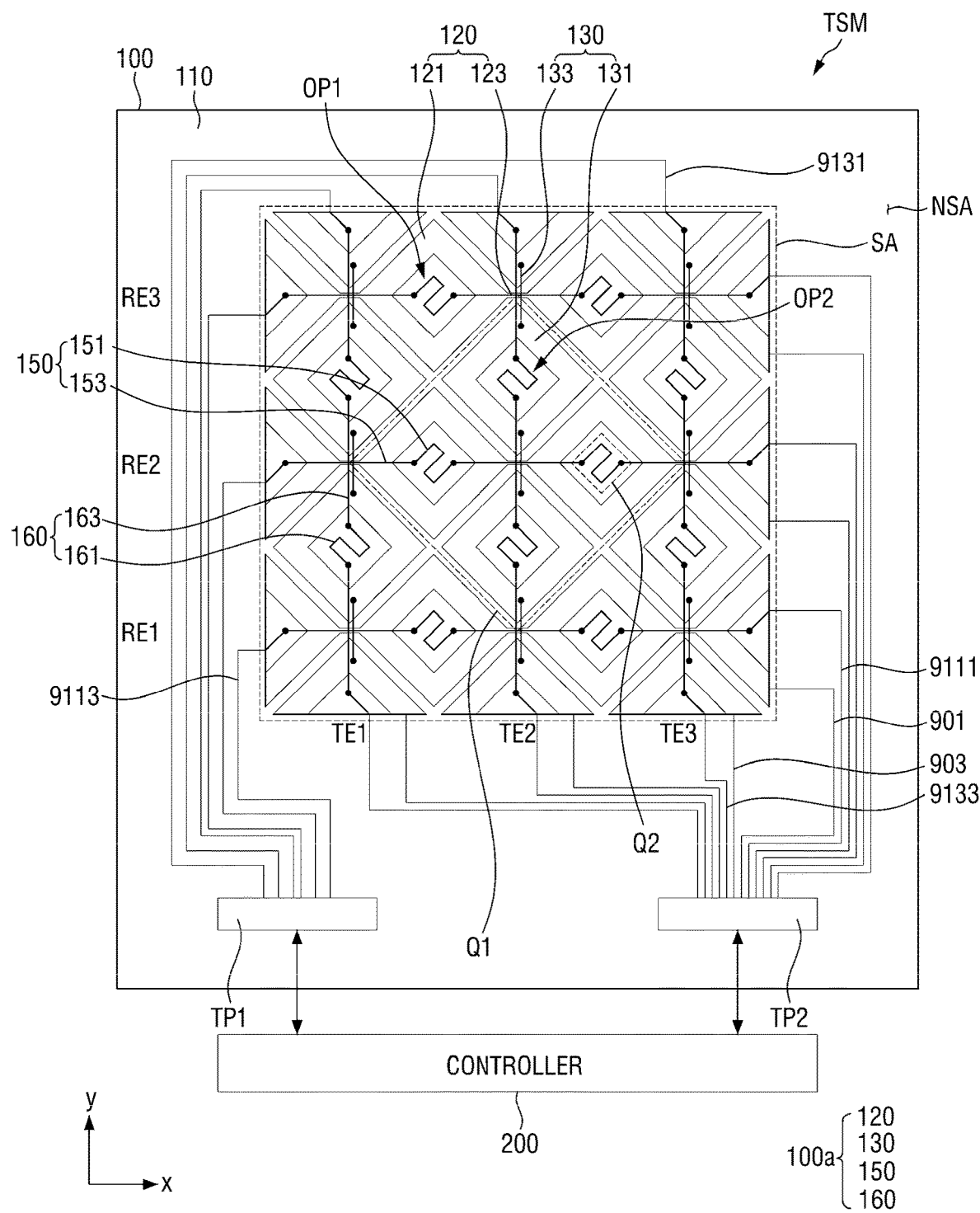
FIG. 4 is a plan view of a touch sensor according to an exemplary embodiment of the present disclosure.

The shapes, sizes, and/or arrangement directions of the first electrode members 120 and the second electrode members 130 are not particularly limited. In a non-limiting example, the first electrode members 120 and the second electrode members 130 may be configured as illustrated in FIG. 4.

The first electrode members 120 and the second electrode members 130 may be electrically connected to the controller 220. In some exemplary embodiments, the second electrode members 130 may be driving electrode members receiving driving signals Ts for detecting touch input from the controller 200, and the first electrode members 120 may be sensing electrode members outputting sensing signals Rs for detecting touch input to the controller 200.

The first electrode members 120 and the second electrode members 130 may overlap with at least one electrode provided on the display panel 300. For example, in a case where the display panel 300 is an OLED display panel, the first electrode members 120 and the second electrode members 130 may overlap with a cathode electrode of the display panel 300.

In the sensing area SA of the sensor module 100, a plurality of first strain gauges 150 and a plurality of second strain gauges 160 for detecting touch pressure may be provided. As a force is applied to the first strain gauges 150 and the second strain gauges 160, the lengths or cross-sectional areas of the first strain gauges 150 and the second strain gauges 160 change, and the resistances of the first strain gauges 150 and the second strain gauges 160 also change. The first strain gauges 150 and the second strain gauges 160 may be spaced apart from the first electrode members 120 and the second electrode members 130 and may be insulated from the first electrode members 120 and the second electrode members 130.

In some exemplary embodiments, the first strain gauges 150, like the first electrode members 120, may extend in the first direction x. Also, in some exemplary embodiments, the second strain gauges 160, like the second electrode members 130, may extend in the second direction y.

Although not specifically illustrated, a noise sensing electrode member for detecting noise may be further provided in the sensing area SA of the sensor module 100.

The controller 200 may be electrically connected to the sensor module 100 and may thus be able to provide the driving signals Ts to the sensor module 100, to receive the sensing signals Rs, which correspond to the driving signals Ts, from the sensor module 100, and to thereby detect the location of touch input. Also, the controller 200 may be electrically connected to the first strain gauges 150 and the second strain gauges 160 and may thus be able to detect touch pressure. The controller 200 may include a touch driver 210, a touch detector 230, and a pressure detector 250.

The touch driver 210 may provide the driving signals Ts for detecting touch input to the second electrode members 130.

The touch detector 230 may receive the sensing signals Rs, which correspond to the driving signals Ts, from the first electrode members 120 and may thereby detect the presence and/or the location of touch input. The sensing signals Rs may be mutual capacitance variations generated between the first electrode members 120 and the second electrode members 130. Specifically, in response to touch input being generated, the mutual capacitance at or near the location where the touch input is generated varies. The touch detector 230 may receive mutual capacitance variations generated between the first electrode members 120 and the second electrode members 130 as the sensing signals Rs and may detect the presence and/or the location of touch input using the received mutual capacitance variations. However, the present disclosure is not limited to this. In another example, the touch detector 230 may detect touch input based on self-capacitance variations.

The touch detector 230 may include at least one amplification circuit amplifying the sensing signals Rs and an analog-to-digital converter and a processor connected to the output terminal of the amplification circuit.

The pressure detector 250 may be electrically connected to the first strain gauges 150 and the second strain gauges 160 and may detect touch pressure based on variations in the resistances of the first strain gauges 150 and the second strain gauges 160. The pressure detector 250 may include Wheatstone bridge circuit modules electrically connected to the first strain gauges 150 or the second strain gauges 160. As many Wheatstone bridge circuit modules as there are first strain gauges 150 or second strain gauges 160 may be provided.

The touch driver 210, the touch detector 230, and the pressure detector 250 may be incorporated into a single touch IC, but the present disclosure is not limited thereto.

In another example, the touch driver 210 and the touch detector 230 may be incorporated into a single touch IC, and the pressure detector 250 may be disposed outside the touch IC. For example, the pressure detector 250 may be disposed on the display panel 300 or on a flexible printed circuit board.

A passivation layer 500 may be disposed on the sensor module 100. The passivation layer 500 may, for example, include a window member. The passivation layer 500 may be attached on the sensor module 100 via an optically clear adhesive or the like.

Although not specifically illustrated, the display device 1 may further include an optical member. For example, an optical member such as a polarizing film may be interposed between the sensor module 100 and the passivation layer 500.

The touch sensor TSM will hereinafter be described with reference to FIGS. 4, 5, 6, 7, 8, 9, 10, 11, 12, 13, 14, and 15.

Figure 5:
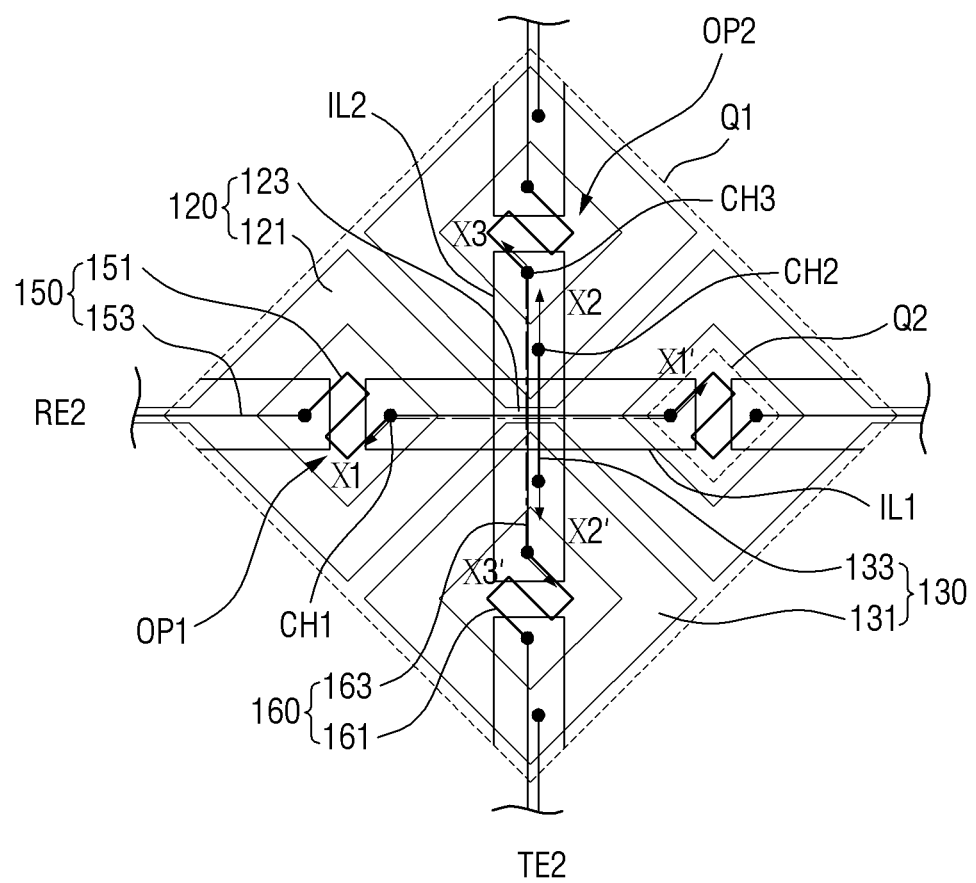
FIG. 5 is an enlarged plan view illustrating a part Q1 of FIG. 4.
Figure 6:
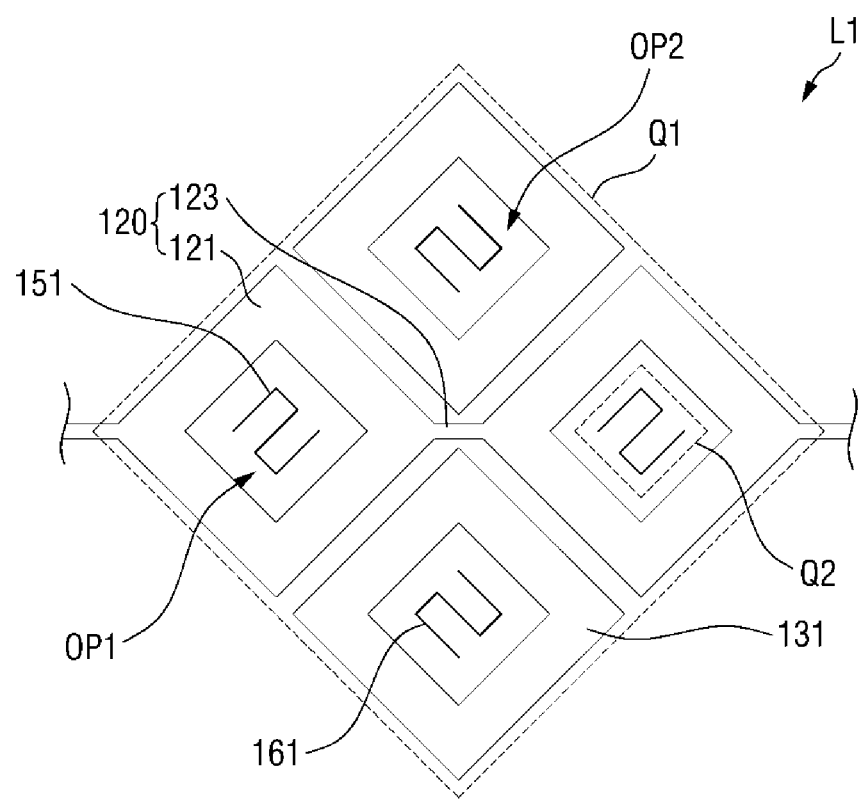
FIG. 6 is an enlarged plan view illustrating a first layer of a sensor module of FIG. 5.
Figure 7:
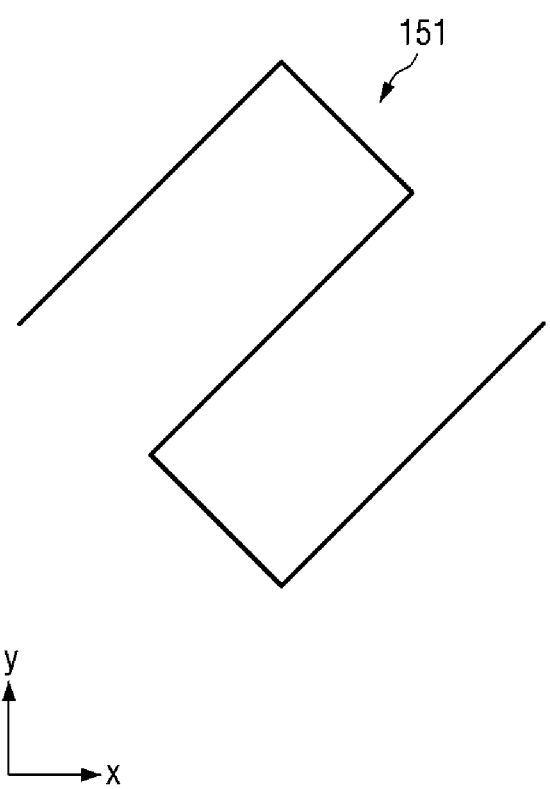
FIG. 7 is a plan view illustrating a part Q2 of FIG. 5.
Figure 8:
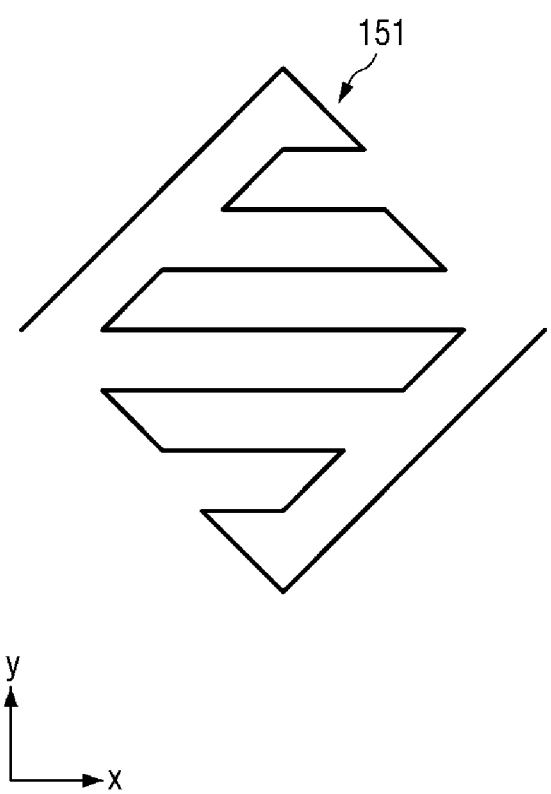
FIGS. 8 and 9 are schematic views illustrating modified examples of a resistance line illustrated in FIG. 7.
Figure 9:
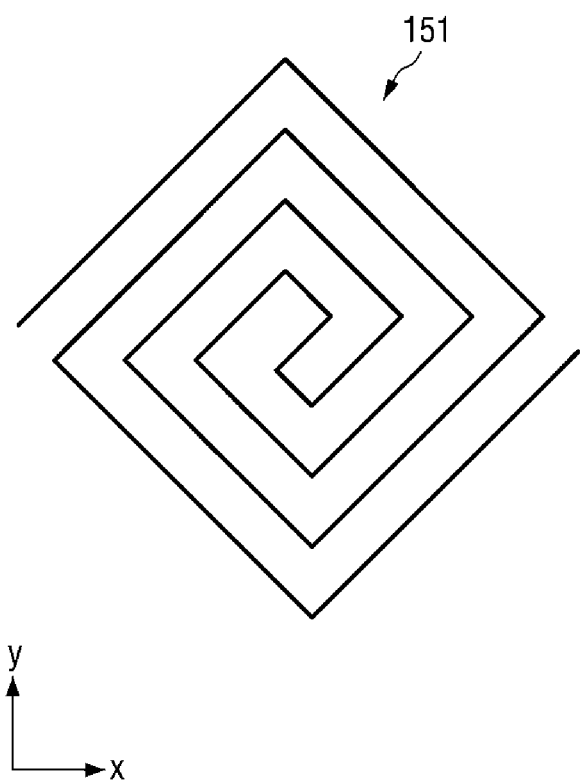
Figure 10:
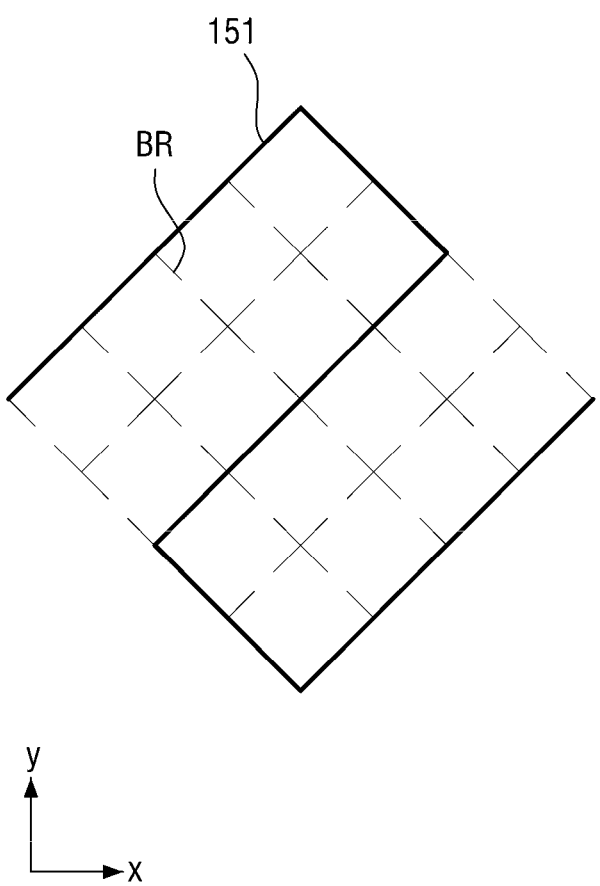
FIG. 10 is an enlarged plan view illustrating a modified example of the structure illustrated in FIG. 7.
Figure 11:
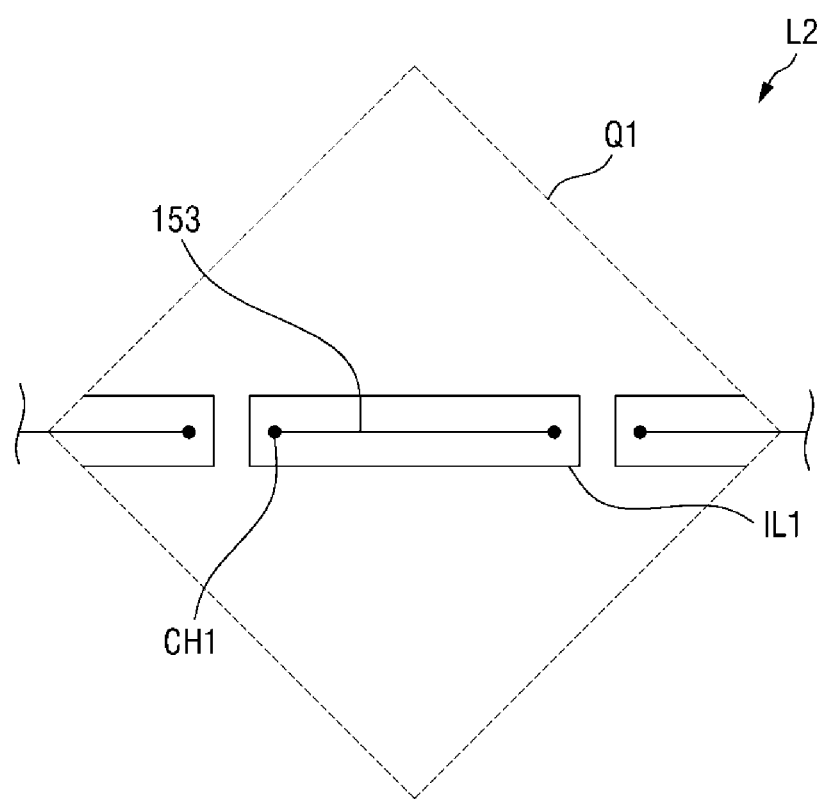
FIG. 11 is an enlarged plan view illustrating a second layer of the sensor module of FIG. 5.
Figure 12:
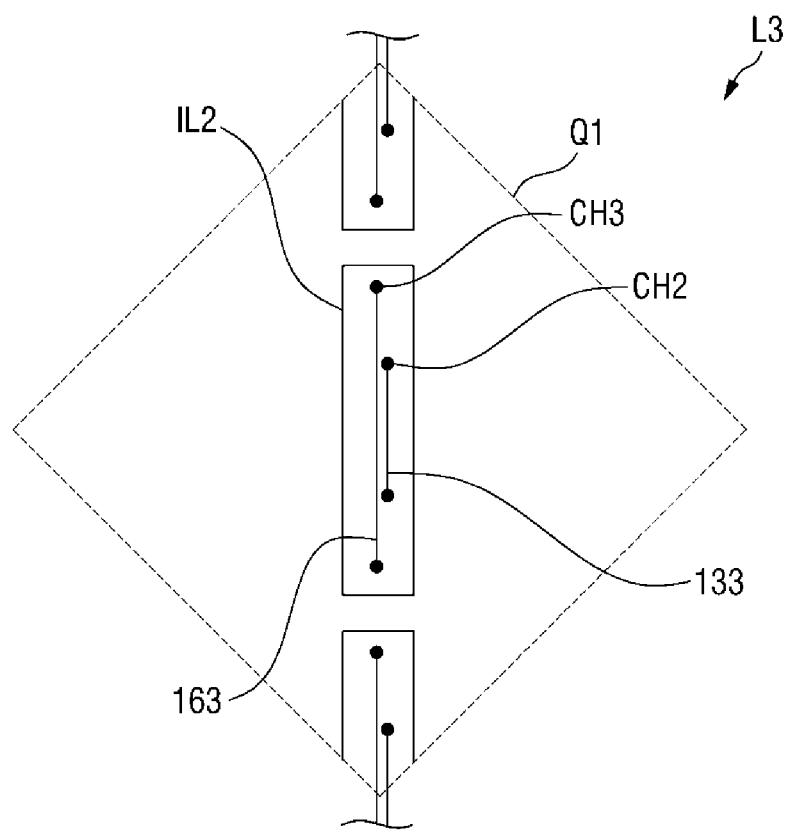
FIG. 12 is an enlarged plan view illustrating a third layer of a sensor module of FIG. 5.
Figure 13:
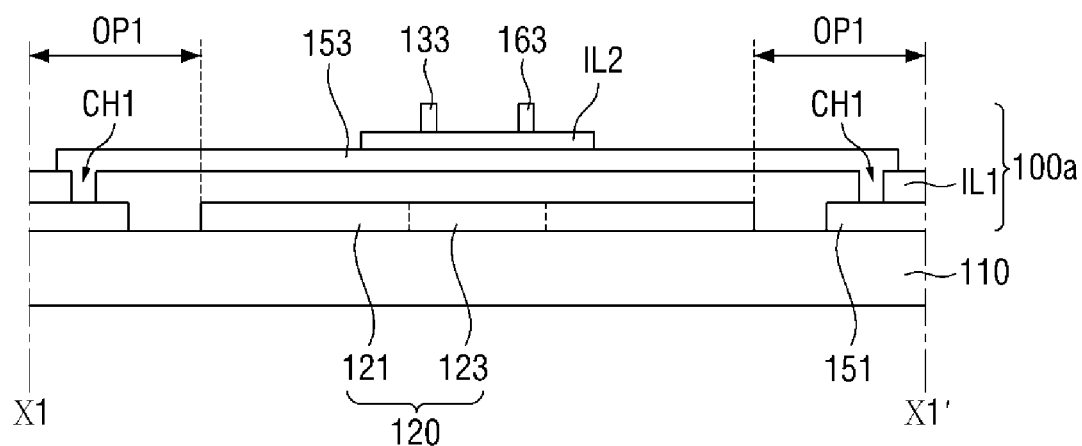
FIG. 13 is a cross-sectional view taken along a sectional line X1-X1' of FIG. 5.
Figure 14:
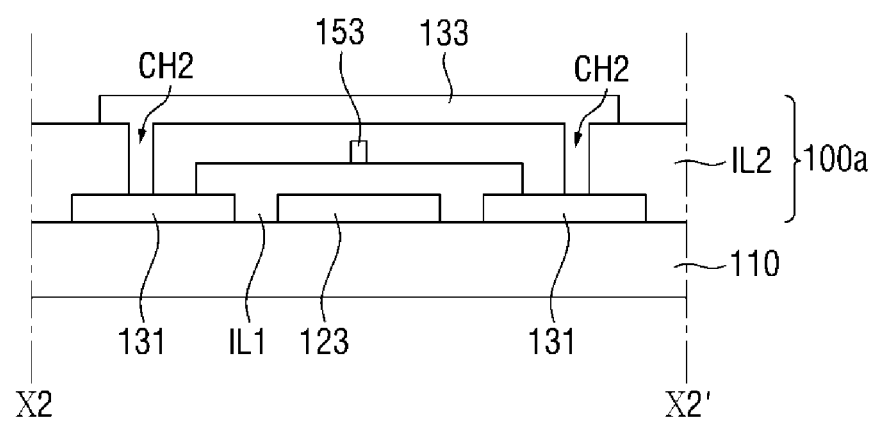
FIG. 14 is a cross-sectional view taken along a sectional line X2-X2' of FIG. 5.
Figure 15:
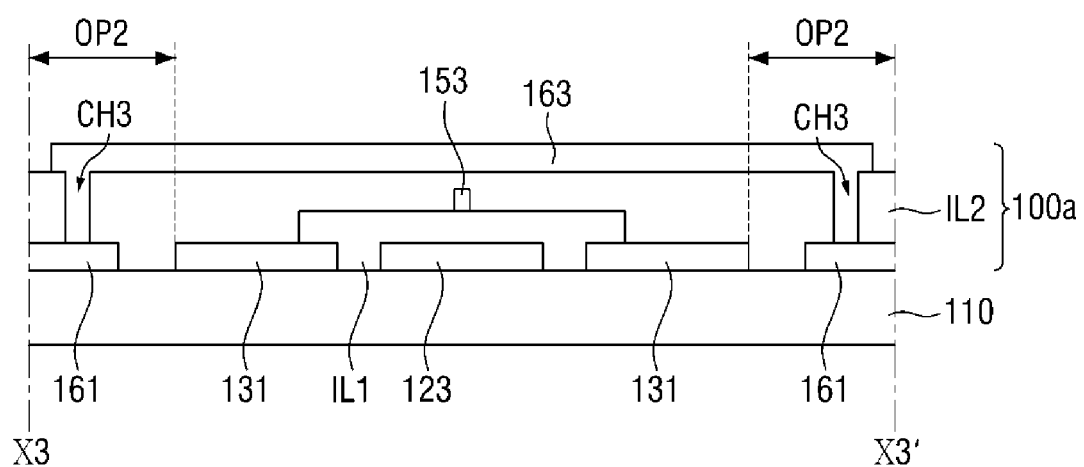
FIG. 15 is a cross-sectional view taken along a sectional line X3-X3' of FIG. 5.

FIG. 4 is a plan view of a touch sensor according to an exemplary embodiment of the present disclosure. FIG. 5 is an enlarged plan view illustrating a part Q1 of FIG. 4. FIG. 6 is an enlarged plan view illustrating a first layer of a sensor module of FIG. 5. FIG. 7 is a plan view illustrating a part Q2 of FIG. 5. FIGS. 8 and 9 are schematic views illustrating modified examples of a resistance line illustrated in FIG. 7. FIG. 10 is an enlarged plan view illustrating a modified example of the structure illustrated in FIG. 7. FIG. 11 is an enlarged plan view illustrating a second layer of the sensor module of FIG. 5. FIG. 12 is an enlarged plan view illustrating a third layer of a sensor module of FIG. 5. FIG. 13 is a cross-sectional view taken along a sectional line X1-X1' of FIG. 5. FIG. 14 is a cross-sectional view taken along a sectional line X2-X2' of FIG. 5. FIG. 15 is a cross-sectional view taken along a sectional line X3-X3' of FIG. 5.

Referring to FIGS. 4, 5, 6, 7, 8, 9, 10, 11, 12, 13, 14, and 15, the sensor module 100 includes a base layer 110 and a sensing pattern 100a disposed on the base layer 110. The sensing pattern 100a includes the first electrode members 120, the second electrode members 130, the first strain gauges 150, and the second strain gauges 160.

The base layer 110 may include the sensing area SA and the peripheral area NSA. The base layer 110, which is a layer that becomes the base for the sensing pattern 100a, may be one of the layers of the display panel 300. For example, in a case where the sensor module 100 and the display panel 300 are formed in one integral body with each other, the base layer 110 may be at least one layer that forms the display panel 300. Specifically, the base layer 110 may be, for example, a TFE layer. In another example, the base layer 110 may be a rigid substrate or a flexible substrate. Specifically, the base layer 110 may be, for example, a rigid substrate formed of glass or tempered glass or may be a flexible substrate formed of a thin film including a flexible plastic material. An example in which the base layer 110 is one of the layers of the display panel 300, e.g., a TFE layer, will hereinafter be described.

In the sensing area SA of the base layer 110, the first electrode members 120, the second electrode members 130, which are insulated from the first electrode members 120, and the first strain gauges 150 and the second strain gauges 160, which are insulated from the first electrode members 120 and the second electrode members 130, may be disposed.

The first electrode members 120 may extend in the first direction x and may be spaced apart from one another in the second direction y. The first electrode members 120, which are spaced apart from one another in the second direction y, may form electrode rows. FIG. 4 illustrates that three first electrode members 120 are arranged along the second direction y to form three rows, i.e., first, second, and third electrode rows RE1, RE2, and RE3, along the second direction y, but the present disclosure is not limited thereto. That is, the number of first electrode members 120 is not particularly limited.

Each of the first electrode members 120 may include a plurality of first touch electrodes 121 arranged along the first direction x and first connectors 123 electrically connecting pairs of adjacent first touch electrodes 121 in the first direction x. The expression "connection", as used herein, encompasses a physical and/or electrical connection between two elements.

The first touch electrodes 121 may be disposed in a first layer L1. The first touch electrodes 121 may have a rhombic shape, but the present disclosure is not limited thereto. That is, the first touch electrodes 121 may have various other shapes such as a triangular, rectangular, pentagonal, circular, or bar shape.

The first touch electrodes 121 may include a conductive material. For example, the conductive material may include a metal or an alloy thereof. The metal may be gold (Au), silver (Ag), aluminum (Al), molybdenum (Mo), chromium (Cr), titanium (Ti), nickel (Ni), neodymium (Nd), copper (Cu), or platinum (Pt). The first touch electrodes 121 may be formed of a transparent conductive material. The transparent conductive material may be silver nanowires (AgNWs), indium tin oxide (ITO), indium zinc oxide (IZO), antimony zinc oxide (AZO), indium tin zinc oxide (ITZO), zinc oxide (ZnO), tin oxide (SnO2), carbon nanotubes, or graphene.

The first touch electrodes 121 may have a single or multilayer structure. In a case where the first touch electrodes 121 have a multilayer structure, the first touch electrodes 121 may include multiple metal layers. For example, the first touch electrodes 121 may have a triple-layer structure of Ti/Al/Ti.

The first touch electrodes 121 may be formed to have a mesh structure in order to be prevented or reduced from being visible to a user. In a case where the first touch electrodes 121 have a mesh structure, the first touch electrodes 121 may be disposed to not overlap with an emission area of the display panel 300. In other words, in a case where the first touch electrodes 121 have a mesh structure, mesh holes may be defined in the first touch electrodes 121 to overlap with the emission area of the display panel 300.

The first touch electrodes 121 may include first openings OP1. For example, the first touch electrodes 121 may be open at least in the middle thereof and may thus expose the underlying layer. For example, in a case where the base layer 110 is disposed below the first touch electrodes 121, the base layer 110 may be exposed through the first openings OP1.

The first connectors 123 may electrically connect pairs of adjacent first touch electrodes 121 in the first direction x and may be in contact with the first touch electrodes 121. The first connectors 123 may be disposed in the same layer as the first touch electrodes 121, i.e., in the first layer L1, but the present disclosure is not limited thereto. In another example, the first connectors 123 may be disposed in a different layer from the first touch electrodes 121 and may be connected to the first touch electrodes 121 via contact holes.

The first connectors 123 may include a conductive material. In some exemplary embodiments, the first connectors 123 may include the same material as the first touch electrodes 121 or may include at least one of the aforementioned exemplary materials of the first touch electrodes 121. The first connectors 123 may have a single- or multilayer structure. For example, the first connectors 123 may have a triple-layer structure of Ti/Al/Ti. However, the present disclosure is not limited to this. In another example, the first connectors 123 may be formed of a different material from the first touch electrodes 121.

FIG. 4 illustrates that a first connector 123 is disposed between each pair of adjacent first touch electrodes 121 in the first direction x, but the number of first connectors 123 disposed between each pair of adjacent first touch electrodes 121 in the first direction x may vary. For example, two or more first connectors 123 may be disposed between each pair of adjacent first touch electrodes 121 in the first direction x.

As already mentioned above, the second electrode members 130 may extend in the second direction y and may be spaced apart from one another in the first direction x. The second electrode members 130, which are spaced apart from one another in the first direction x, may form electrode columns. FIG. 4 illustrates that three second electrode members 130 are arranged along the second direction y to form three columns, i.e., first, second, and third electrode columns TE1, TE2, and TE3, along the first direction x, but the present disclosure is not limited thereto. That is, the number of second electrode members 130 may vary.

Each of the second electrode members 130 may include a plurality of second touch electrodes 131 arranged along the second direction y and second connectors 133 electrically connecting each pair of adjacent second touch electrodes 131 in the second direction y.

The second touch electrodes 131 may be electrically connected in the second direction y. The second touch electrodes 131 may be spaced apart from one another in the first direction x.

The second touch electrodes 131 may include second openings OP2. For example, the second touch electrodes 131 may be open at least in the middle thereof and may thus expose the underlying layer. For example, in a case where the base layer 110 is disposed below the second touch electrodes 131, the base layer 110 may be exposed through the second openings OP2.

FIG. 4 illustrates that the first openings OP1 have the same area as the second openings OP2, but the present disclosure is not limited thereto. In other embodiments, the second openings OP2 may have a different area from the first openings OP1. For example, the second openings OP2 may have a larger area than the first openings OP1.

The second touch electrodes 131 may be disposed in the same layer as the first touch electrodes 121, i.e., in the first layer L1. The second touch electrodes 131 may have a rhombic shape, but the present disclosure is not limited thereto. That is, the second touch electrodes 131 may have various other shapes such as a triangular, rectangular, pentagonal, circular, or bar shape.

In an example, the first touch electrodes 121 and/or the second touch electrodes 131 may have one or more zigzag-shaped sides. In a case where the first touch electrodes 121 and/or the second touch electrodes 131 have one or more zigzag-shaped sides, moiré interference patterns can be prevented or reduced from being visible to the user, and any display defects that may be caused by moiré interference can be reduced and the display quality may be improved.

The second connectors 133 may electrically connect pairs of adjacent second touch electrodes 131 in the second direction y and may be in contact with the second touch electrodes 131. The second connectors 133 may be formed as bridge-type connecting patterns. In this case, the second connectors 133 may be disposed in a second or third layer L2 or L3, which is different from the first layer L1 where the second touch electrodes 131 are disposed.

The second connectors 133 may be insulated from the first connectors 123 and may intersect the first connectors 123. In some exemplary embodiments, insulating layers (IL1 and L2) may be disposed between the second connectors 133 and the first connectors 123. That is, the second touch electrodes 131 may be disposed on the base layer 110, a second insulating layer IL2 may be disposed on the second touch electrodes 131, and the second connectors 133 may be disposed on the second insulating layer IL2.

The second insulating layer IL2 may be disposed between the second touch electrodes 131 and the second connectors 133, and the second connectors 133 and the second touch electrodes 131 may be connected to, and in contact with, each other, via second contact holes CH2 formed in the second insulating layer IL2.

The insulating layers (IL1 and L2) may include an insulating material. In some exemplary embodiments, the insulating material may be an inorganic insulating material or an organic insulating material. The inorganic insulating material may include at least one of aluminum oxide, titanium oxide, silicon oxide, silicon oxynitride, zirconium oxide, and hafnium oxide. The organic insulating material may include at least one of an acrylic resin, a methacrylic resin, a polyisoprene, a vinyl resin, an epoxy resin, a urethane resin, a cellulose resin, a siloxane resin, a polyimide resin, a polyamide resin, and a perylene resin.

The second connectors 133 may include a conductive material. In some exemplary embodiments, the second connectors 133 may include the same material as the second touch electrodes 131 or may include at least one of the aforementioned exemplary materials of the second touch electrodes 131.

In some exemplary embodiments, in a case where the first touch electrodes 121 have a mesh structure, the first connectors 123 and the second touch electrodes 131 may also have a mesh structure.

FIG. 4 illustrates that a second connector 133 is disposed between each pair of adjacent second touch electrodes 131 in the second direction y, but the number of second connectors 133 disposed between each pair of adjacent second touch electrodes 131 in the second direction y may vary. In a case where second connectors 133 include multiple second connectors, disposed between each pair of adjacent second touch electrodes 131 in the second direction y, the reliability and stability of the touch sensor TSM can be improved.

The second touch electrodes 131 may be driving electrodes receiving the driving signals Ts for detecting the location of touch input, and the first touch electrodes 121 may be sensing electrodes outputting the sensing signals for detecting the location of touch input. In another example, the second touch electrodes 131 may be sensing electrodes outputting the sensing signals for detecting the location of touch input, and the first touch electrodes 121 may be driving electrodes receiving the driving signals Ts for detecting the location of touch input.

In the sensing area SA of the sensor module 100, the first strain gauges 150 and the second strain gauges 160 may be disposed.

The first strain gauges 150 may be disposed in rows formed by the first touch electrodes 121. Each of the first strain gauges 150 may include first resistance lines 151 and first connecting lines 153.

The first resistance lines 151 may be disposed in the first openings OP1, which are formed in the first touch electrodes 121 of the first, second, and third electrode rows RE1, RE2, and RE3, and may be spaced apart from the first touch electrodes 121.

The first resistance lines 151 may be formed into a predetermined bent shape. As pressure with a predetermined magnitude is applied to the sensor module 100 of the touch sensor TSM, the length or cross-sectional area of the first resistance lines 151 changes, and the resistance of the first resistance lines 151 also changes. Accordingly, the magnitude of touch pressure can be determined based on resistance variations in the first resistance lines 151.

In some exemplary embodiments, each of the first resistance lines 151 may include two or more bent parts and parts extending in a direction that intersects both the first and second directions x and y, as illustrated in FIG. 5.

The shape of the first resistance lines 151 may vary. For example, as illustrated in FIG. 8, each of the first resistance lines 151 may include multiple bent parts and parts extending in parallel to the first direction x. In another example, as illustrated in FIG. 9, the first resistance lines 151 may be formed into an angular spiral shape. In yet another example, unlike in the example of FIG. 9, the first resistance lines 151 may be formed into a curved spiral shape.

The first resistance lines 151 may be disposed in the same layer as the first touch electrodes 121 and the second touch electrodes 131, i.e., in the first layer L1.

The first resistance lines 151 may include a conductive material. For example, the first resistance lines 151 may be formed of the same material as the first touch electrodes 121 and the second touch electrodes 131.

In a case where the first touch electrodes 121 and the second touch electrodes 131 are formed into a mesh structure, the first resistance lines 151 may be formed by removing parts of the mesh structure. In this case, as illustrated in FIG. 10, a plurality of branch parts BR may be formed in each of the first openings OP1 to be spaced apart from one another and to be connected to one of the first resistance lines 151.

The branch parts BR may be parts of the mesh structure, formed by the first touch electrodes 121 and the second touch electrodes 131, that remain unremoved. The branch parts BR may be spaced apart from the second touch electrodes 131, may be disposed in the same layer as the first resistance lines 151, and may be formed of the same material as the first resistance lines 151.

The first connecting lines 153 may electrically connect pairs of adjacent first resistance lines 151 in the first direction x and may be in contact with the first resistance lines 151. The first connecting lines 153 may not be in contact with, but may be spaced apart from, the first electrode members 120 and the second electrode members 130.

A first insulating layer IL1 may be disposed between the first resistance lines 151 and the first connecting lines 153, and the first resistance lines 151 and the first connecting lines 153 may be in contact with each other via first contact holes CH1, which are formed in the first insulating layer IL1.

FIG. 11 illustrates that a first connecting line 153 is disposed between each pair of adjacent first resistance lines 151 in the first direction x, but the present disclosure is not limited thereto. That is, the number of first connecting lines 153 disposed between each pair of adjacent first resistance lines 151 in the first direction x may vary. For example, two or more first connecting lines 153 may be disposed between a pair of adjacent first resistance lines 151 in the first direction x. In this example, the reliability of the connection between the first resistance lines 151 can be improved.

The second strain gauges 160 may be disposed in columns formed by the second touch electrodes 131. Each of the second strain gauges 160 may include second resistance lines 161 and second connecting lines 163.

The second resistance lines 161 may be disposed in the second openings OP2, which are formed in the second touch electrodes 131 of the first, second, and third electrode columns TE1, TE2, and TE3, and may be spaced apart from the second touch electrodes 131.

The second resistance lines 161, like the first resistance lines 151, may be formed into a predetermined bent shape. As pressure with a predetermined magnitude is applied to the sensor module 100 of the touch sensor TSM, the length or cross-sectional area of the second resistance lines 161 changes, and the resistance of the second resistance lines 161 also changes. Accordingly, the magnitude of touch pressure can be determined based on resistance variations in the first resistance lines 151.

The shape of the second resistance lines 161 may be the same as, or similar to, the shape of the first resistance lines 151 described above with reference to FIGS. 7, 8, 9, and 10, and thus, a detailed description thereof will be omitted.

The second resistance lines 161 may be disposed in the same layer as the first touch electrodes 121 and the second touch electrodes 131, i.e., in the first layer L1. The second resistance lines 161 may include a conductive material. For example, the second resistance lines 161 may be formed of the same material as the first touch electrodes 121 and the second touch electrodes 131.

The second connecting lines 163 may electrically connect pairs of adjacent second resistance lines 161 in the second direction y and may be in contact with the second resistance lines 161. The second connecting lines 163 may not be in contact with, but may be spaced apart from, the first electrode members 120 and the second electrode members 130.

Also, the second connecting lines 163 may not be in contact with, but may be spaced apart from, the first strain gauges 150.

The second insulating layer IL2 may be disposed between the second resistance lines 161 and the second connecting lines 163, and the second resistance lines 161 and the second connecting lines 163 may be in contact with each other via third contact holes CH3, which are formed in the second insulating layer IL2.

FIG. 12 illustrates that a second connecting line 163 is disposed between each pair of adjacent second resistance lines 161 in the second direction y, but the present disclosure is not limited thereto. That is, the number of second connecting lines 163 disposed between each pair of adjacent second resistance lines 161 in the second direction y may vary. For example, two or more second connecting lines 163 may be disposed between a pair of adjacent second resistance lines 161 in the second direction y. In this example, the reliability of the connection between the second resistance lines 161 can be improved.

In the peripheral area NSA of the base layer 110, wires (901 and 903) and signal lines (9111, 9113, 9131, and 9133) may be disposed.

For example, the wires (901 and 903) may include first wires 901 connected to the first electrode members 120 and second wires 903 connected to the second electrode members 130.

As illustrated in FIG. 4, the first wires 901 may be connected to first ends of the first electrode members 120, the second wires 903 may be connected to first ends of the second electrode members 130, and no particular wires may be connected to second ends of the first electrode members 120 and second ends of the second electrode members 130. That is, the wires connected to the first electrode members 120 and the wires connected to the second electrode members 130 may have a single routing structure, but the present disclosure is not limited thereto.

The signal lines (9111, 9113, 9131, and 9133) may include first signal lines 9111 connected to first ends of the first strain gauges 150, second signal lines 9113 connected to second ends of the first strain gauges 150, third signal lines 9131 connected to first ends of the second strain gauges 160, and fourth signal lines 9133 connected to second ends of the second strain gauges 160.

In the peripheral area NSA of the base layer 110, pad members (TP1 and TP2) may be disposed. The pad portions (TP1 and TP2) may be connected to the wires (901 and 903) and the signal lines (9111, 9113, 9131, and 9133). The controller 200 may be electrically connected to the pad members (TP1 and TP2).

The pad members (TP1 and TP2) may include first and second pad members TP1 and TP2 spaced apart from each other in the first direction x. For example, the first pad member TP1 may be connected to the second signal lines 9113 and the third signal lines 9131, and the second pad member TP2 may be connected to the first wires 901, the second wires 903, the first signal lines 9111, and the fourth signal lines 9133. However, the present disclosure is not limited to this example. For example, the first and second pad members TP1 and TP2 may not be spaced apart from each other, but may form a single pad member together. The wires and the signal lines connected to each of the first and second pad members TP1 and TP2 may vary. The connections of the wires 901 and 903 and the signal lines 9111, 9113, 9131, and 9133 are exemplary and the embodiments are not limited thereto.

Since in the touch sensor TSM, the first touch electrodes 121, the second touch electrodes 131, the first resistance lines 151, and the second resistance lines 161 are disposed in the same layer, i.e., in the first layer L1, the first touch electrodes 121, the second touch electrodes 131, the first resistance lines 151, and the second resistance lines 161 can be formed at the same time, and the manufacture of a display device can be simplified. Also, a thin touch sensor TSM having a pressure sensing function can be implemented.

In the aforementioned embodiments, the base layer 110, which is the base for the sensor module 100, may be a TFE layer of an OLED display panel. In this case, the base layer 110 may be formed as a multilayer film consisting of at least one organic film and at least one inorganic film or as a single-layer film including organic and inorganic materials. For example, the base layer 110 may be formed as a multilayer film consisting of at least two inorganic films and at least one organic film interposed between the inorganic films. In a display device in which the base layer 110 is implemented as a TFE layer of an OLED display panel, the elements of the display panel 300 may be disposed on one surface of the base layer 110, and the electrodes of the sensor module 100 may be disposed on the other surface of the base layer 110.

Figure 16:
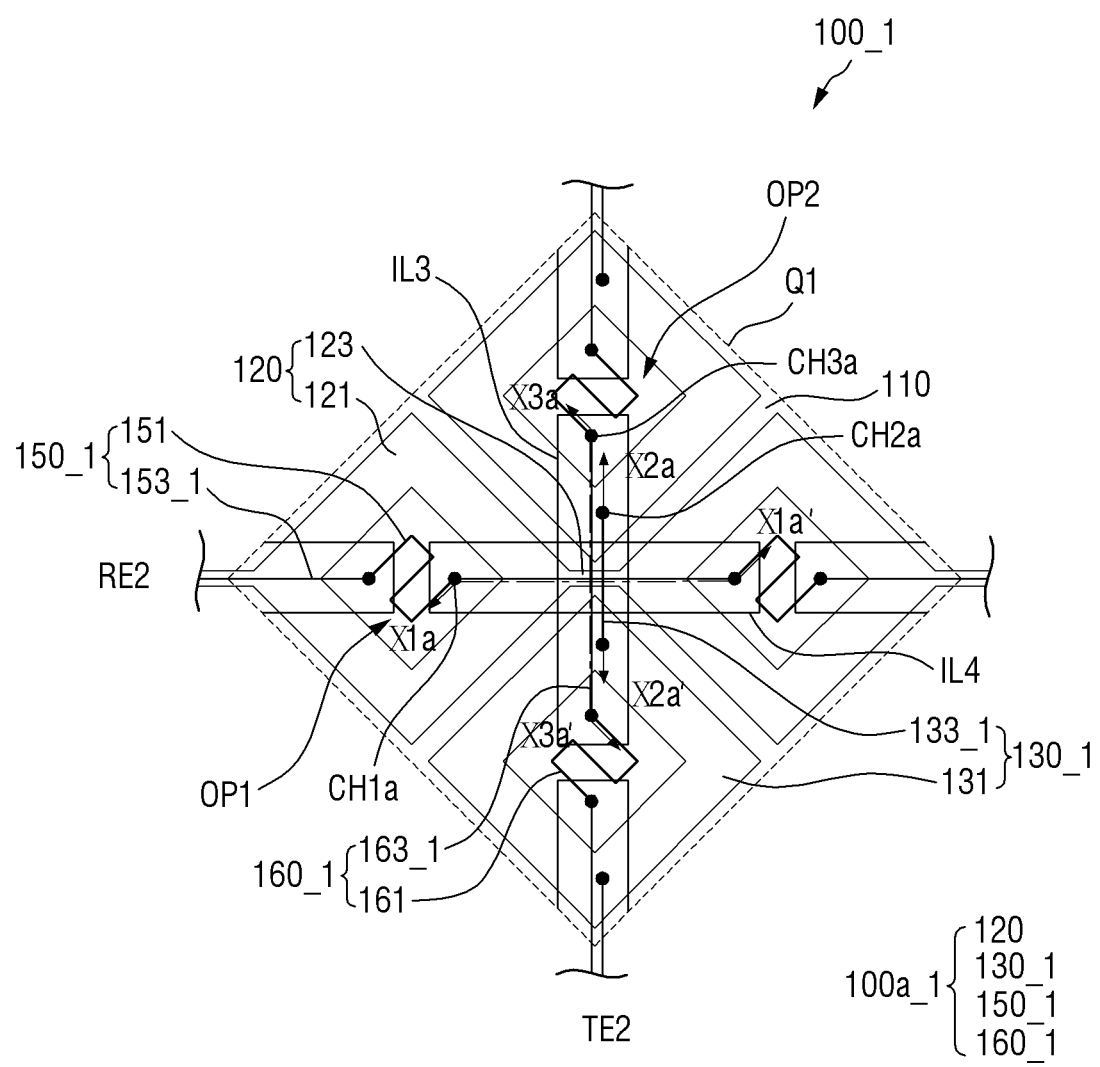
FIG. 16 is an enlarged plan view illustrating a modified example of the structure illustrated in FIG. 5.
Figure 17:
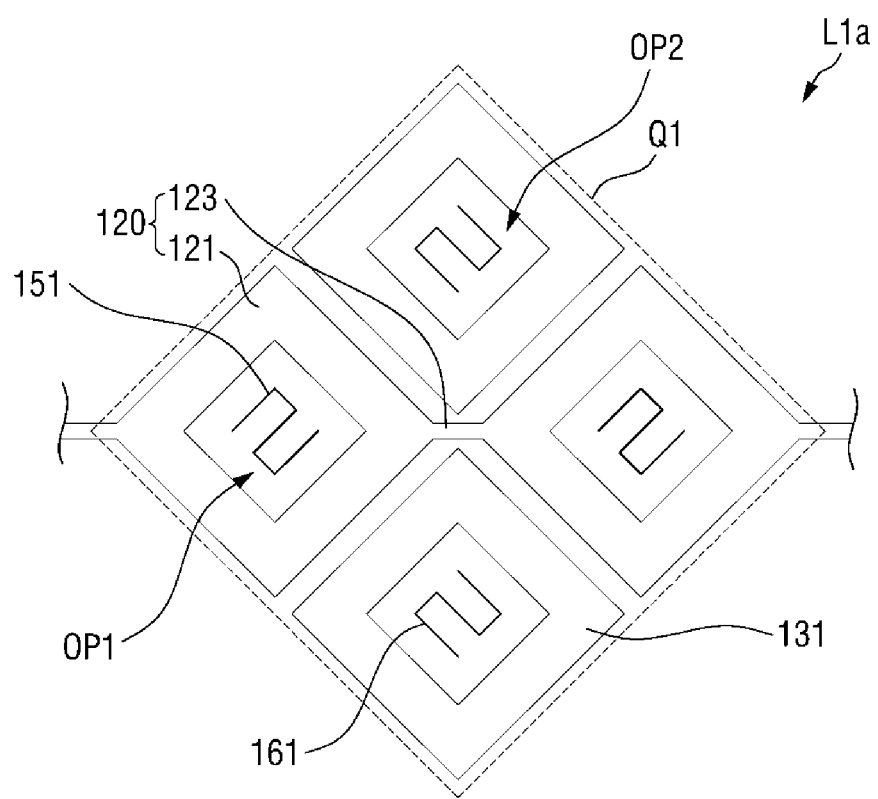
FIG. 17 is an enlarged plan view illustrating a first layer of a sensor module of FIG. 16.
Figure 18:
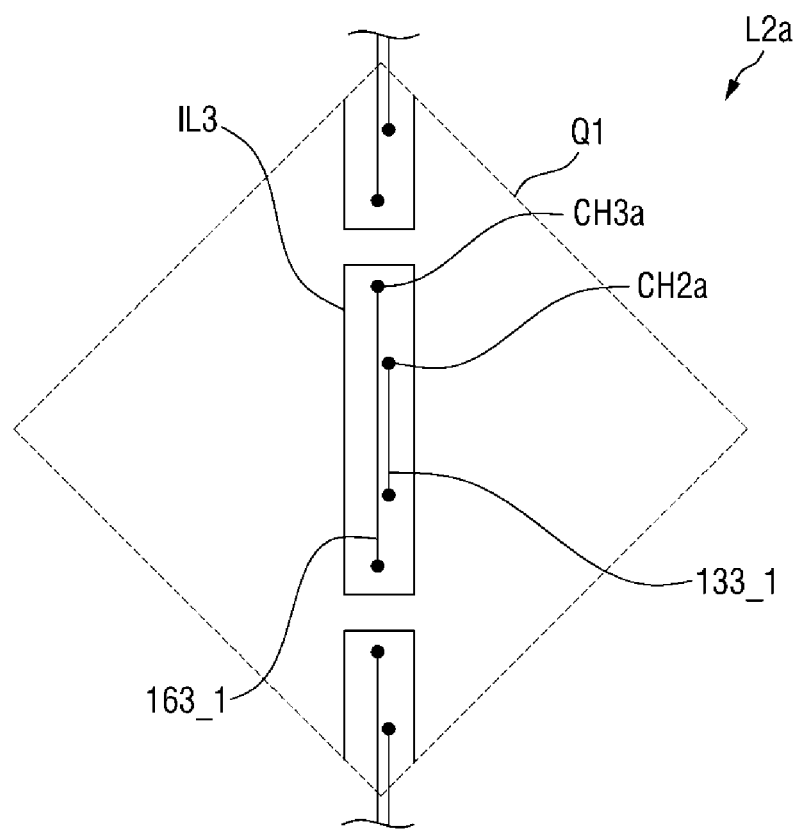
FIG. 18 is an enlarged plan view illustrating a second layer of the sensor module of FIG. 16.
Figure 19:
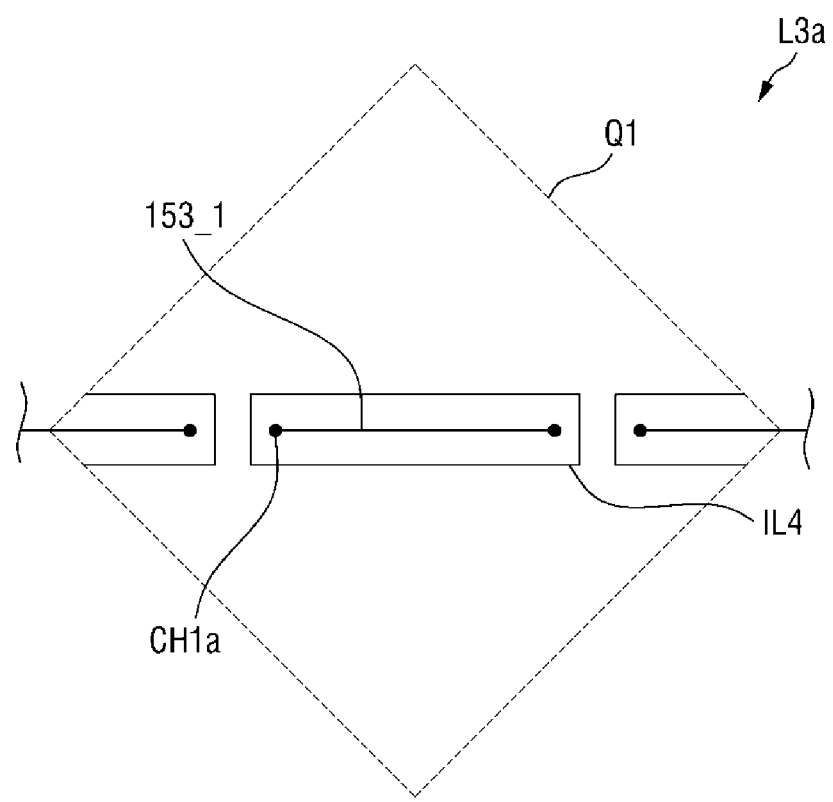
FIG. 19 is an enlarged plan view illustrating a third layer of the sensor module of FIG. 16.
Figure 20:
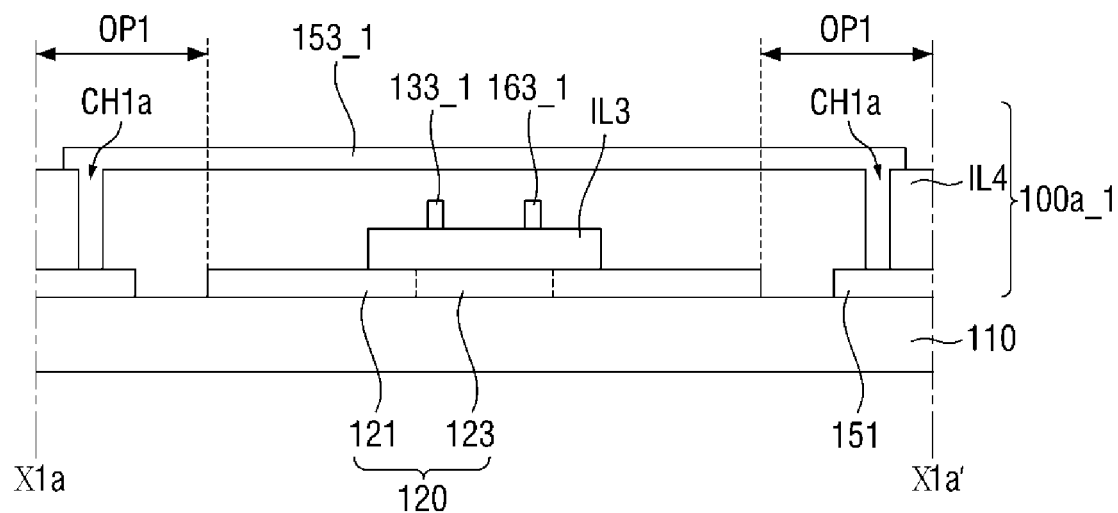
FIG. 20 is a cross-sectional view taken along a sectional line X1a-X1a' of FIG. 16.
Figure 21:
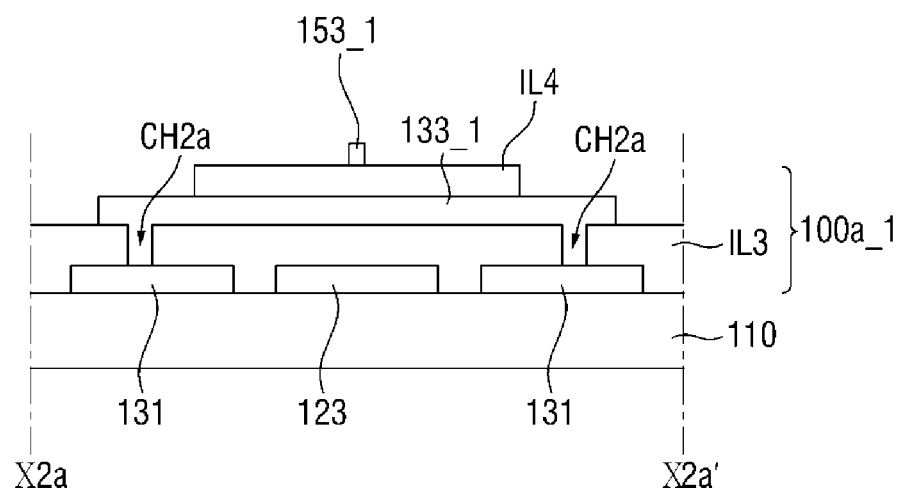
FIG. 21 is a cross-sectional view taken along a sectional line X2a-X2a' of FIG. 16.
Figure 22:
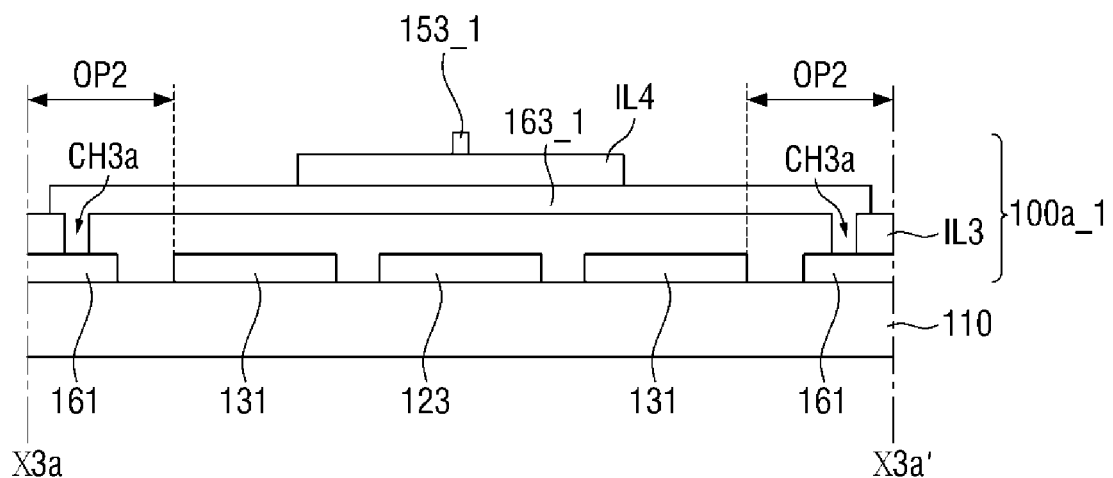
FIG. 22 is a cross-sectional view taken along a sectional line X3a-X3a' of FIG. 16.

FIG. 16 is an enlarged plan view illustrating a modified example of the structure illustrated in FIG. 5. FIG. 17 is an enlarged plan view illustrating a first layer of a sensor module of FIG. 16. FIG. 18 is an enlarged plan view illustrating a second layer of the sensor module of FIG. 16. FIG. 19 is an enlarged plan view illustrating a third layer of the sensor module of FIG. 16. FIG. 20 is a cross-sectional view taken along a sectional line X1a-X1a' of FIG. 16. FIG. 21 is a cross-sectional view taken along a sectional line X2a-X2a' of FIG. 16. FIG. 22 is a cross-sectional view taken along a sectional line X3a-X3a' of FIG. 16.

The modified examples illustrated in FIGS. 16, 17, 18, 19, 20, 21, and 22 differ from the aforementioned embodiments in the elements of each layer (L1, L2, and L3) and thus will hereinafter be described, focusing mainly on the differences with the aforementioned embodiments.

Referring to FIGS. 16, 17, 18, 19, 20, 21, and 22, a sensor module 100_1 includes a base layer 110 and a sensing pattern 100a_1 disposed on the base layer 110. The sensing pattern 100a_1 includes first electrode members 120, second electrode members 130_1, first strain gauges 150_1, and second strain gauges 160_1.

In a first layer L1a of the sensor module 100_1, first touch electrodes 121, first connectors 123, second touch electrodes 131, first resistance lines 151, and second resistance lines 161 may be disposed.

In a second layer L2a of the sensor module 100_1, a third insulating layer IL3 may be disposed, and second connectors 133_1 and second connecting lines 163_1, which are disposed on the third insulating layer IL3, may also be disposed.

The third insulating layer IL3 may be disposed between the second connecting lines 163_1 (and the second connectors 133_1) and the second touch electrodes 131 (and the second resistance lines 161), which are disposed in the first layer L1a, and may thus insulate the second connecting lines 163_1 and the second connectors 133_1 from the second touch electrodes 131 and the second resistance lines 161. The third insulating layer IL3 may include second contact holes CH2a and third contact holes CH3a.

The second connectors 133_1 may be disposed in the second layer L2a and may be electrically connected to the second touch electrodes 131 via the second contact holes CH2a. The second connecting lines 163_1 may be disposed in the second layer L2a and may be electrically connected to the second resistance lines 161 via the third contact holes CH3a. The second connectors 133_1 and the second connecting lines 163_1 may be disposed between the third insulating layer IL3 and a fourth insulating layer IL4.

In a third layer L3a of the sensor module 100_1, the fourth insulating layer IL4 may be disposed, and first connecting lines 153_1, which are disposed on the fourth insulating layer IL4, may also be disposed.

The fourth insulating layer IL4 may be disposed between the first connecting lines 153_1 and the first resistance lines 151, which are disposed in the first layer L1a, and may thus insulate the first connecting lines 153_1 from the first resistance lines 151. The fourth insulating layer IL4 may include first contact holes CH1a.

The first connecting lines 153_1 may be disposed in the third layer L3a and may be electrically connected to the first resistance lines 151 via the first contact holes Ch1a. The second connecting lines 163_1 and the second connectors 133_1 may be disposed between the first connecting lines 153_1 and the base layer 110 to be spaced apart from each other.

Figure 23:
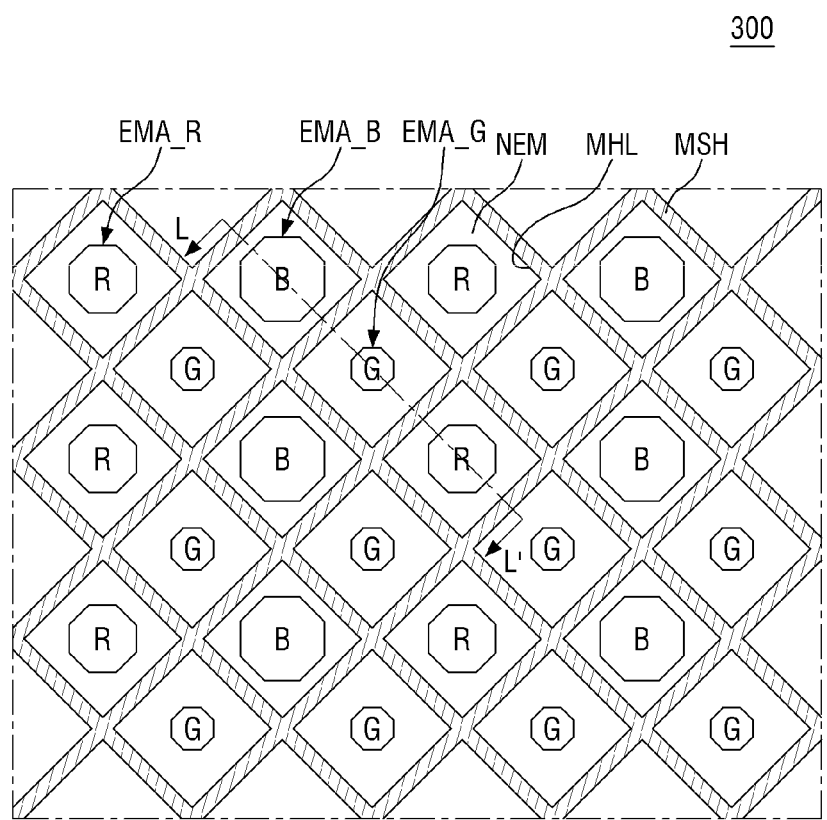
FIG. 23 is a layout view illustrating the relative arrangement of pixels of a display panel and a mesh-type pattern of a sensor module according to an exemplary embodiment of the present disclosure.
Figure 24:
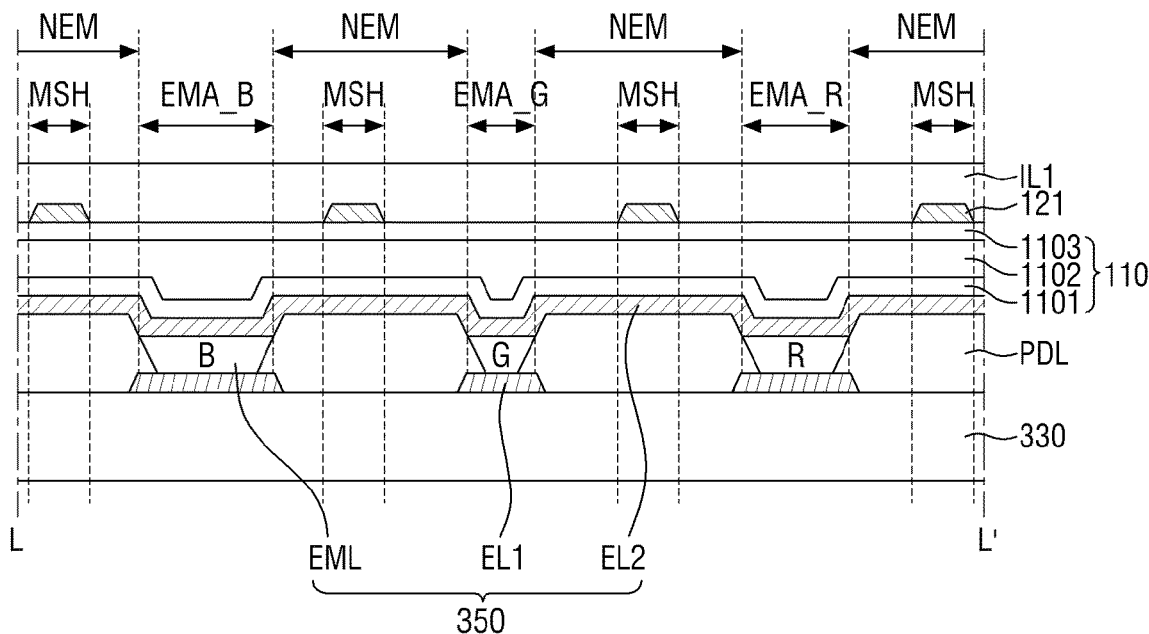
FIG. 24 is a cross-sectional view taken along a sectional line L-L' of FIG. 23 illustrating a part of the structure illustrated in FIG. 23.

FIG. 23 is a layout view illustrating the relative arrangement of pixels of a display panel and a mesh-type pattern of a sensor module according to an exemplary embodiment of the present disclosure. FIG. 24 is a cross-sectional view taken along a sectional line L-L' of FIG. 23 illustrating a part of the structure illustrated in FIG. 23.

Specifically, FIGS. 23 and 24 illustrate an area overlapping, in a plan view, with the first touch electrodes 121 and the first insulating layer IL1 of FIG. 4.

Referring to FIG. 23, the display panel 300 may include a plurality of pixels. Each of the pixels includes an emission area EMA. A non-emission area NEM is disposed between the emission areas EMA of the pixels. A mesh-type pattern MSH is disposed in the non-emission area NEM.

The pixels include first color pixels, second color pixels, and third color pixels. The pixels may be arranged in various manners. In one embodiment, the first color pixels (e.g., red pixels) and the second color pixels (e.g., blue pixels) may be alternately arranged along the first direction x to form a first row, and the third color pixels (e.g., green pixels) may be arranged in a second row adjacent to the first row along the first direction x. The pixels belonging to the second row may be staggered, in the first direction x, with the pixels belonging to the first row. The number of third color pixels belonging to the second row may be twice the number of first or second color pixels belonging to the first row. The pattern of the arrangement of the pixels in the first and second rows may be repeated along the first direction x.

The emission areas EMA of the pixels may differ from one another. For example, emission areas EMA_B of the second color pixels may be larger than emission areas EMA_R of the first color pixels, and emission areas EMA_G of the third color pixels may be smaller than the emission areas EMA_R of the first color pixels.

The emission areas EMA of the pixels may have a substantially octagonal shape, but the present disclosure is not limited thereto. In another example, the emission areas EMA of the pixels may have a circular shape, a rhombic shape, another polygonal shape, or a polygonal shape with rounded corners.

The mesh-type pattern MSH may be disposed in the non-emission area NEM along the edges of the pixels. The mesh-type pattern MSH may not overlap with the emission areas EMA of the pixels. The width of the mesh-type pattern MSH may be smaller than the width of the non-emission area NEM. In one embodiment, mesh holes MHL exposed by the mesh-type pattern MSH may have a substantially rhombic shape. The mesh holes MHL may have the same size or may have different sizes depending on the size of the emission areas EMA that they expose. FIG. 23 illustrates that one mesh hole MHL corresponds to one emission area EMA, but the present disclosure is not limited thereto. In another example, one mesh hole MHL may correspond to two or more emission areas EMA.

FIG. 24 is a cross-sectional illustrating a part of the structure illustrated in FIG. 23. FIG. 24 illustrates light-emitting elements 350 and elements above the light-emitting elements 350, while omitting most of the layers below first electrodes EL1.

Referring to FIG. 24, the first electrodes EL1 is disposed on a base substrate 330 for each pixel. Pixel defining films PDL, which expose the first electrodes EL1, may be disposed on the first electrodes EL1. The pixel defining films PDL may be disposed in the non-emission area NEM.

Emission layers EML may be disposed on the first electrodes EL1, which are exposed by pixel defining films PDL, and a second electrode EL2 may be disposed on the emission layers EML. The second electrode EL2 may be disposed on the entire surface of the base substrate 330 regardless of the distinction between the pixels. The first electrodes EL1, the emission layers EML, and the second electrode EL2 may form the light-emitting elements 350.

A TFE layer 110 including a first inorganic film 1101, an organic film 1102, and a second inorganic film 1103 may be disposed on the second electrode EL2, and the first touch electrodes 121 and the first insulating layer IL1 may be sequentially disposed on the TFE layer 110. Since FIG. 24 is a cross-sectional view illustrating the area overlapping with the first touch electrodes 121 and the first insulating layer IL2, second touch electrodes 131 are not illustrated in FIG. 24.

The first touch electrodes 121 may be disposed in the non-emission area NEM to overlap with the pixel defining films PDL. Since the first touch electrodes 121 form the mesh-type pattern MSH and do not overlap with the emission areas EMA, the first touch electrodes 121 may not be visible to a user.

Figure 25:
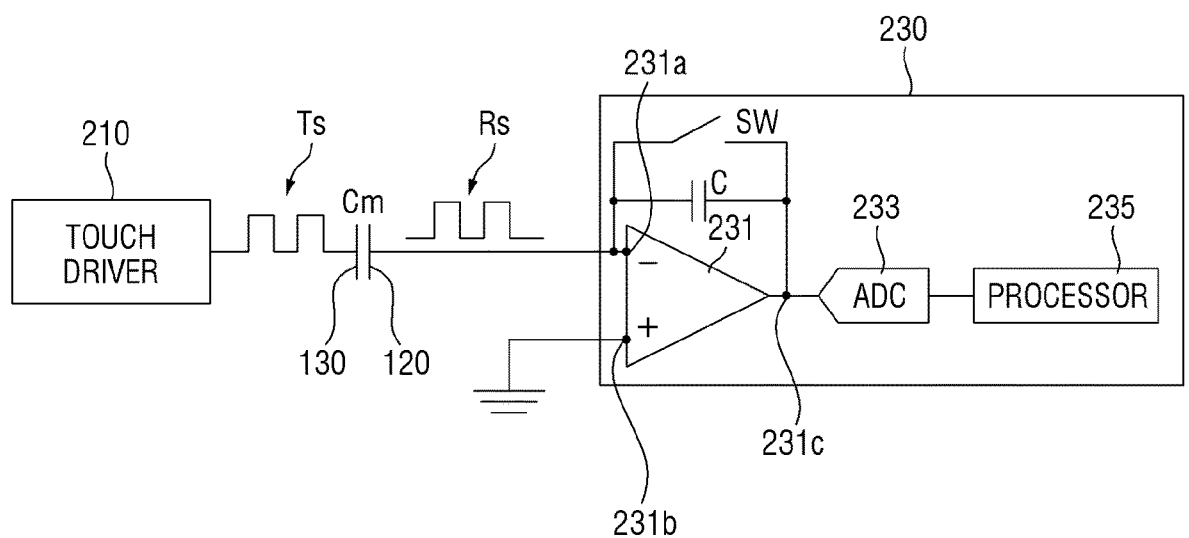
FIG. 25 is a circuit diagram illustrating an equivalent circuit of the touch sensor for explaining a touch location detection operation according to the exemplary embodiment of FIG. 4.

FIG. 25 is a circuit diagram illustrating an equivalent circuit of the touch sensor for explaining a touch location detection operation according to the exemplary embodiment of FIG. 4.

Referring to FIGS. 4 and 25, the touch driver 210 may provide the driving signals Ts to the second electrode members 130 via the second wires 903. The driving signals Ts may be sequentially provided to the second electrode members 130.

The touch detector 230 may receive the sensing signals Rs from the first electrode members 120 via the first wires 901. As already mentioned above, the sensing signals Rs may include information regarding mutual capacitances variations generated between the first electrode members 120 and the second electrode members 130. In response to the driving signals Ts being provided to the second electrode members 130, mutual capacitances Cm are generated between the first electrode members 120 and the second electrode members 130. In response to touch input being generated, the mutual capacitances Cm change, and the sensing signals Rs may include information regarding the changes in the mutual capacitances Cm.

The touch detector 230 may include at least one first amplification circuit 231 such as an operational (OP) amplifier, an analog-to-digital converter 233, and a processor 235.

The first amplification circuit 231 may include a first input terminal 231a, a second input terminal 231b, and an output terminal 231c. The first input terminal 231a of the first amplification circuit 231, e.g., the inverting input terminal of an OP amplifier may be electrically connected to the first electrode members 120 via the first wires 901 or the like, and the sensing signals Rs may be input to the first input terminal 231a.

The second input terminal 231b of the first amplification circuit 231, e.g., the non-inverting input terminal of an OP amplifier, is a reference potential terminal, and may be connected to, for example, a reference power source. In some exemplary embodiments, the reference power source may be a ground source, but the present disclosure is not limited thereto. In a case where the sensor module 100 includes noise sensing electrode members, the second input terminal 231b may be electrically connected to the noise sensing electrode members.

In a case where the sensor module 100 includes the noise sensing electrode members, the touch sensor TSM can effectively cancel noise signals received from the display panel 300 and can improve signal-to-noise ratio (SNR). Accordingly, the malfunction of the touch sensor TSM that may be caused by noise signals can be minimized, and the sensitivity of the touch sensor TSM can be improved.

In some exemplary embodiments, a capacitor C and a reset switch SW may be connected in parallel between the first input terminal 231a and the output terminal 231c of the first amplification circuit 231.

The first amplification circuit 231 may be implemented as an inverting amplification circuit, but the present disclosure is not limited thereto. In another example, the first amplification circuit 231 may be implemented as a non-inverting amplification circuit.

The output terminal 231c of the first amplification circuit 231 may be electrically connected to the analog-to-digital converter 233.

The analog-to-digital converter 233 may convert input analog signals into digital signals. As many analog-to-digital converters 233 as there are first electrode members 120 may be provided to correspond one-to-one to the first electrode members 120. In another example, the first electrode members 120 may be configured to share a single analog-to-digital converter 233 together, in which case, a switching circuit for choosing a channel may be additionally provided.

The processor 235 may process digital signals provided by the analog-to-digital converter 233 and may detect touch input based on the result of the processing. For example, the processor 235 may detect the presence and the location of touch input by analyzing sensing signals amplified by the first amplification circuit 231 and digitalized by the analog-to-digital converter 233. The processor 235 may be implemented as a microprocessor (MPU), in which case, a memory for driving the processor 235 may be additionally provided in the touch detector 230. However, the configuration of the processor 235 is not particularly limited. In another example, the processor 235 may be implemented as a microcontroller (MCU) or the like.

A touch pressure detection operation of the controller 200 will hereinafter be described with reference to FIGS. 26, 27, and 28.

Figure 26:
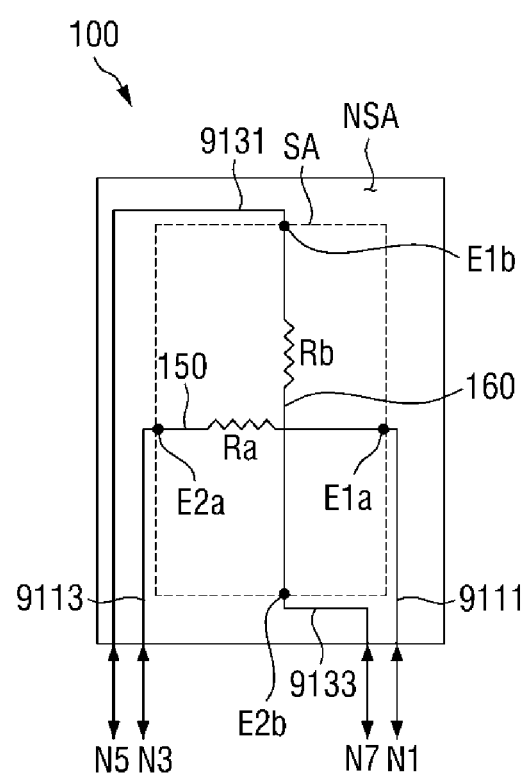
FIG. 26 is a circuit diagram illustrating an equivalent circuit of a first strain gauge, a second strain gauge, and signal lines of the touch sensor according to the exemplary embodiment of FIG. 4 for explaining how the first and second strain gauges are connected to Wheatstone bridge circuits.

FIG. 26 is a circuit diagram illustrating an equivalent circuit of a first strain gauge, a second strain gauge, and signal lines of the touch sensor according to the exemplary embodiment of FIG. 4 for explaining how the first and second strain gauges are connected to Wheatstone bridge circuits. FIG. 27 is a circuit diagram illustrating an equivalent circuit of a first pressure detector including a first Wheatstone bridge circuit electrically connected to a first strain gauge of the touch sensor according to the exemplary embodiment of FIG. 4. FIG. 28 is a circuit diagram illustrating an equivalent circuit of a second pressure detector including a second Wheatstone bridge circuit electrically connected to a second strain gauge of the touch sensor according to the exemplary embodiment of FIG. 4.

Figure 27:
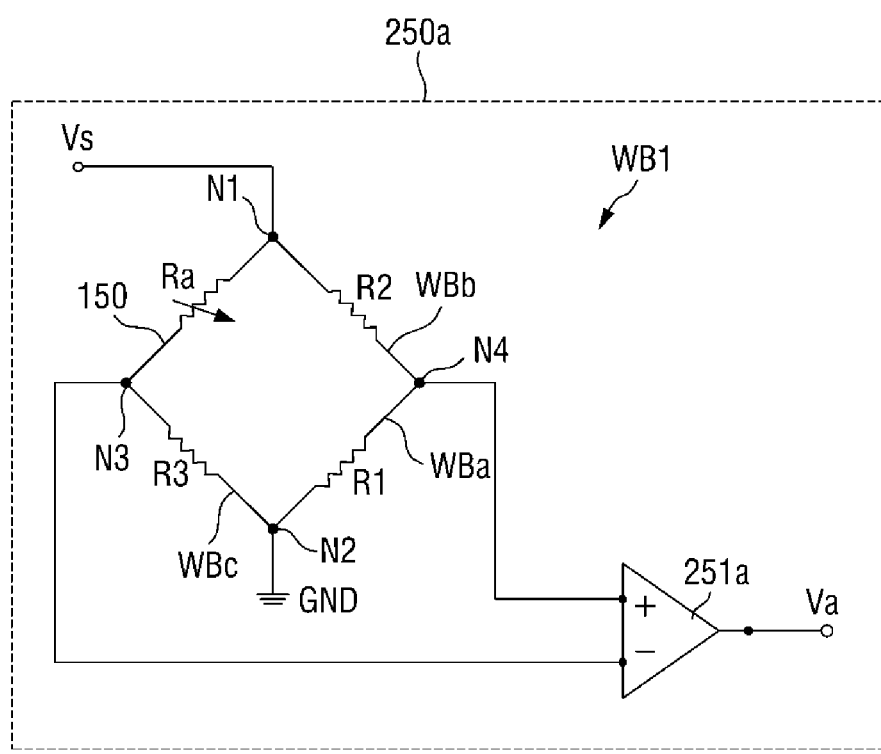
FIG. 27 is a circuit diagram illustrating an equivalent circuit of a first pressure detector including a first Wheatstone bridge circuit to which the first strain gauge of FIG. 26 is electrically connected.
Figure 28:
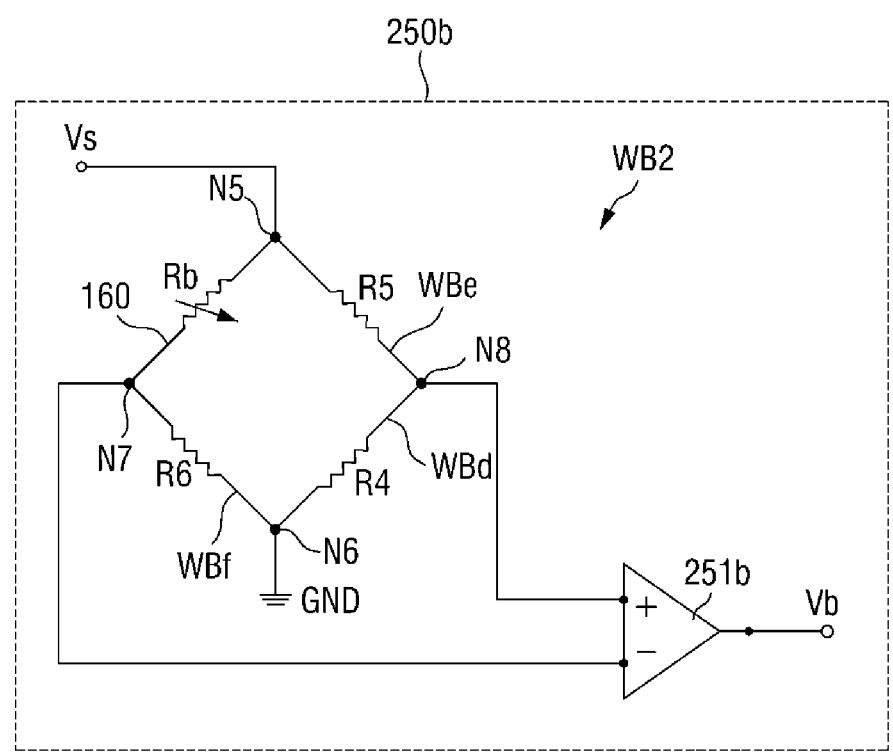
FIG. 28 is a circuit diagram illustrating an equivalent circuit of a second pressure detector including a second Wheatstone bridge circuit to which the second strain gauge of FIG. 26 is electrically connected.

Referring to FIGS. 26, 27, and 28, a first strain gauge 150 may include first and second ends E1a and E2a, which are disposed at opposite locations in the first direction x. As already mentioned above, the first end E1a of the first strain gauge 150 may be connected to a first signal line 9111, and the second end E2a of the first strain gauge 150 may be connected to a second signal line 9113. A second strain gauge 160 may include first and second ends E1b and E2b, which are disposed at opposite locations of the sensing area SA in the second direction y. As already mentioned above, the first end E1b of the second strain gauge 160 may be connected to a third signal line 9131, and the second end E2b of the second strain gauge 160 may be connected to a fourth signal line 9133.

For convenience, FIG. 26 illustrates that there are only one first strain gauge 150 and only one second strain gauge 160 in the sensing area SA, but actually, in the sensing area SA, a plurality of first strain gauges 150 and a plurality of second strain gauges 160 may be disposed. Accordingly, as many first Wheatstone bridge circuit modules WB1 as there are first strain gauges 150 may be provided in the controller 200 to be connected to the first strain gauges 150, and as many second Wheatstone bridge circuit modules WB2 as there are second strain gauges 160 may be provided in the controller 200 to be connected to the second strain gauges 160.

First, a first strain gauge 150 and a first Wheatstone bridge circuit module WB1 including the first strain gauge 150 will hereinafter be described. Since the first and second ends E1a and E2a of the first strain gauge 150 are disposed at opposite locations of the sensing area SA, the first and second signal lines 9111 and 9113 may also be disposed at opposite locations of the sensing area SA.

A first pressure detector 250a may include a first Wheatstone bridge circuit module WB1. The first pressure detector 250a may further include an analog-to-digital converter and a processor for detecting a first voltage Va output from the first Wheatstone bridge circuit module WB1.

The first Wheatstone bridge circuit module WB1 includes a first node N1, a second node N2, a first output node N3, and a second output node N4. A driving voltage Vs may be provided to the first node N1, and the second node N2 may be connected to a ground source GND.

The first Wheatstone bridge circuit module WB1 may further include a first resistor WBa, which is connected to the second node N2 and the second output node N4, a second resistor WBb, which is connected to the first node N1 and the second output node N4, and a third resistor WBc, which is connected to the second node N2 and the first output node N3.

The first, second, and third resistors WBa, WBb, and WBc may have predetermined resistances, i.e., resistances R1, R2, and R3, respectively. That is, the first, second, and third resistors WBa, WBb, and WBc may be fixed resistors.

The first Wheatstone bridge circuit module WB1 may further include a second amplification circuit 251a such as an OP amplifier. The second amplification circuit 251a may include an inverting input terminal, a non-inverting input terminal, and an output terminal. An electrical flow between the first and second output nodes N3 and N4 may be detected via the second amplification circuit 251a. That is, the second amplification circuit 251a may operate as a galvanic element or a voltage measuring element.

One of the first and second output nodes N3 and N4 may be electrically connected to one of the input terminals of the second amplification circuit 251a, and the other output node may be electrically connected to the other input terminal of the second amplification circuit 251a. For example, the first output node N3 may be connected to the inverting input terminal of the second amplification circuit 251a, and the second output node N4 may be connected to the non-inverting input terminal of the second amplification circuit 251a.

The output terminal of the second amplification circuit 251a may output the first voltage Va that is proportional to the difference between voltages input to both input terminals of the second amplification circuit 251a.

The first end E1a of the first strain gauge 150 may be electrically connected to the first node N1 via the first signal line 9111, and the second end E2a of the first strain gauge 150 may be connected to the first output node N3 via the second signal line 9113.

The first strain gauge 150, the first resistor WBa, the second resistor WBb, and the third resistor WBc may be connected to one another to form the first Wheatstone bridge circuit module WB1.

When touch input is yet to be applied, the product of a resistance Ra of the first strain gauge 150 and the resistance R1 of the first resistor WBa may be substantially the same as the product of the resistance R2 of the second resistor WBb and the resistance R3 of the third resistor WBc.

In a case where the product of the resistance Ra of the first strain gauge 150 and the resistance R1 of the first resistor WBa is the same as the product of the resistance R2 of the second resistor WBb and the resistance R3 of the third resistor WBc, the voltage at the first output node N3 and the voltage at the second output node N4 may be the same. In this case, the voltage difference between the first and second output nodes N3 and N4 may be 0V, and the first voltage Va output from the second amplification circuit 251a may be 0V.

On the other hand, in response to touch input being applied to the sensor module 100, the shape of the first strain gauge 150 changes according to the magnitude of the touch input, and the resistance Ra of the first strain gauge 150 changes accordingly. As a result, a voltage difference arises between the first and second output nodes N3 and N4. In this case, the second amplification circuit 251a may output a non-zero voltage as the first voltage Va, and the touch sensor TSM may detect the magnitude or pressure of the touch input by measuring the first voltage Va.

Second, a second strain gauge 160 and a second Wheatstone bridge circuit module WB2 including the second strain gauge 160 will hereinafter be described. Since the first and second ends E1b and E2b of the second strain gauge 160 are disposed at opposite locations of the sensing area SA, the third and fourth signal lines 9131 and 9133 may also be disposed at opposite locations of the sensing area SA.

A second pressure detector 250b may include a second Wheatstone bridge circuit module WB2. The second pressure detector 250b may further include an analog-to-digital converter and a processor for detecting a second voltage Vb output from the second Wheatstone bridge circuit module WB2.

The second Wheatstone bridge circuit module WB2 includes a third node N5, a fourth node N6, a third output node N7, and a fourth output node N8. A driving voltage Vs may be provided to the third node N5, and the fourth node N6 may be connected to the ground source GND.

The second Wheatstone bridge circuit module WB2 may further include a fourth resistor WBd, which is connected to the fourth node N6 and the fourth output node N8, a fifth resistor WBe, which is connected to the third node N5 and the fourth output node N8, and a sixth resistor WBf, which is connected to the fourth node N6 and the third output node N7.

The fourth, fifth, and sixth resistors WBd, WBe, and WBf may have predetermined resistances, i.e., resistances R4, R5, and R6, respectively. That is, the fourth, fifth, and sixth resistors WBd, WBe, and WBf may be fixed resistors.

The second Wheatstone bridge circuit module WB2 may further include a third amplification circuit 251b such as an OP amplifier. The third amplification circuit 251b may include an inverting input terminal, a non-inverting input terminal, and an output terminal. An electrical flow between the third and fourth output nodes N7 and N8 may be detected via the third amplification circuit 251b. That is, the third amplification circuit 251b may operate as a galvanic element or a voltage measuring element.

One of the third and fourth output nodes N7 and N8 may be electrically connected to one of the input terminals of the third amplification circuit 251b, and the other output node may be electrically connected to the other input terminal of the third amplification circuit 251b.

For example, the third output node N7 may be connected to the inverting input terminal of the third amplification circuit 251b, and the fourth output node N8 may be connected to the non-inverting input terminal of the third amplification circuit 251b.

The output terminal of the third amplification circuit 251b may output the second voltage Vb that is proportional to the difference between voltages input to both input terminals of the third amplification circuit 251b.

The first end E1b of the second strain gauge 160 may be electrically connected to the third node N5 via the third signal line 9131, and the second end E2b of the second strain gauge 160 may be connected to the third output node N7 via the fourth signal line 9133.

The second strain gauge 160, the fourth resistor WBd, the fifth resistor WBe, and the sixth resistor WBf may be connected to one another to form the second Wheatstone bridge circuit module WB2.

When touch input is yet to be applied, the product of a resistance Rb of the second strain gauge 160 and the resistance R4 of the fourth resistor WBd may be substantially the same as the product of the resistance R5 of the fifth resistor WBe and the resistance R6 of the sixth resistor WBf.

In a case where the product of the resistance Rb of the second strain gauge 160 and the resistance R4 of the fourth resistor WBd is the same as the product of the resistance R5 of the fifth resistor WBe and the resistance R6 of the sixth resistor WBf, the voltage at the third output node N7 and the voltage at the fourth output node N8 may be the same. In this case, the voltage difference between the third and fourth output nodes N7 and N8 may be 0V, and the second voltage Vb output from the third amplification circuit 251b may be 0V.

On the other hand, in response to touch input being applied to the sensor module 100, the shape of the second strain gauge 160 changes according to the magnitude of the touch input, and the resistance Rb of the second strain gauge 160 changes accordingly. As a result, a voltage difference arises between the third and fourth output nodes N7 and N8. In this case, the third amplification circuit 251b may output a non-zero voltage as the second voltage Vb, and the touch sensor TSM may detect the magnitude or pressure of the touch input by measuring the second voltage Vb.

The electrical connection between the first strain gauge 150 and the first Wheatstone bridge circuit module WB1 and the electrical connection between the second strain gauge 160 and the second Wheatstone bridge circuit module WB2 are not particularly limited, but may vary.

As already mentioned above, the first strain gauges 150 may be disposed above the openings OP1 of the first touch electrodes 121 to extend in the first direction x, and may also be disposed to be spaced apart from one another in the second direction y and thus to form rows. That is, the first strain gauges 150 may detect the pressure of an electrode row corresponding to the location where touch input is generated, among the first, second, and third electrode rows RE1, RE2, and RE3 in the sensing area SA.

The second strain gauges 160 may be disposed above the openings OP2 of the second touch electrodes 131 to extend in the second direction y, and may also be disposed to be spaced apart from one another in the first direction x and thus to form columns. That is, the second strain gauges 160 may detect the pressure of an electrode column corresponding to the location where touch input is generated, among the first, second, and third electrode columns TE1, TE2, and TE3 in the sensing area SA.

In other words, the first pressure detector 250a may detect an electrode row where touch input is generated and the pressure of the touch input via the first strain gauges 150, and the second pressure detector 250b may detect an electrode column where touch input is generated and the pressure of the touch input via the second strain gauges 160. The controller 200 may detect the location and the pressure of touch input using both the first and second pressure detectors 250a and 250b.

The touch sensor TSM can detect the location of the touch input, using the first strain gauges 150 and the second strain gauges 160 as well as the pressure of touch input. That is, the touch sensor TSM can detect the location of touch input using the touch driver 210 without driving the first electrode members 120 and the second electrode members 130.

In the aforementioned embodiments, the first strain gauges 150 extend in the first direction x and detect the pressure of each electrode row, and the second strain gauges 160 extend in the second direction y and detect the pressure of each electrode column. In other embodiments, the first strain gauges 150 may be arranged in the first openings OP1 along the first direction x, but may not be electrically connected, in which case the first resistance lines 151 of the first strain gauges 150 may be connected to separate first signal lines 9111 and separate second signal lines 9113.

Also, the second strain gauges 160 may be arranged in the second openings OP2 along the second direction y, but may not be electrically connected, in which case, the second resistance lines 161 of the second strain gauges 160 may be connected to separate third signal lines 9131 and separate fourth signal lines 9133.

In a case where the first resistance lines 151 of the first strain gauges 150 are not connected to one another and are connected to separate signal lines, pressure can be detected by individual first pressure detectors 250a. Also, in a case where the second resistance lines 161 of the second strain gauges 160 are not connected to one another and are connected to separate signal lines, pressure can be detected by individual second pressure detectors 250b.

In a case where the first resistance lines 151 are connected to separate signal lines and the second resistance lines 161 are also connected to separate signal lines, pressure can be detected more sophisticatedly than in the case of measuring the pressure of each electrode row or column, and touch input can be located more precisely.

Figure 29:
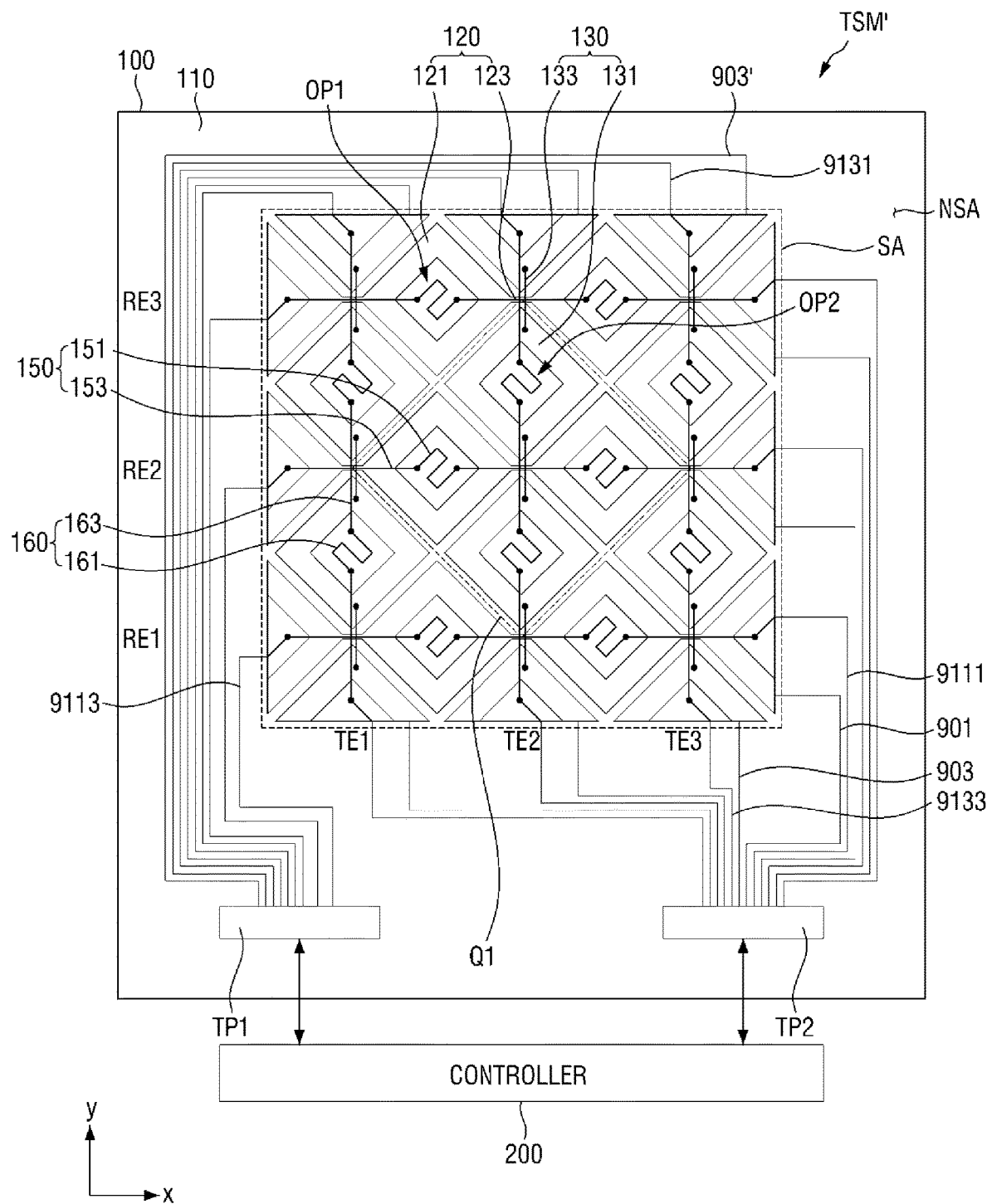
FIG. 29 is a plan view of a touch sensor according to another embodiment of the present disclosure.

FIG. 29 is a plan view of a touch sensor according to another embodiment of the present disclosure. Specifically, FIG. 29 illustrates a touch sensor TSM', which is obtained by adding third wires 903' to the structure illustrated in FIG. 4.

Referring to FIG. 29 and further to FIGS. 4, 5, 6, 7, 8, 9, 10, 11, 12, 13, 14, and 15, the third wires 903' may be further provided, second wires 903 may be connected to first ends of second electrode members 130, and the third wires 903' may be connected to second ends of the second electrode members 130. Here, the second ends of the second electrode members 130 refer to the opposite ends to the ends of the second electrode members 130 to which the second wires 903 are connected. That is, the wires connected to the second electrode members 130 may have a double routing structure, and as a result, RC delays that may be caused by the resistance of the second electrode members 130 can be reduced and the sensitivity of the touch sensor TSM can be improved.

FIG. 29 illustrates an exemplary touch sensor in which the third wires 903' are connected to the second ends of the second electrode members 130, but the present disclosure is not limited thereto. Additional wires may be connected to second ends of first electrode members 120 or to both the second ends of the first electrode members 120 and the second ends of the second electrode members 130. For convenience, the second electrode members 130 are illustrated as having wires (e.g., second wires) connected only to first ends thereof, but the present disclosure is not limited thereto. The wires connected to the second electrode members 130 may have a double routing structure.

Figure 30:
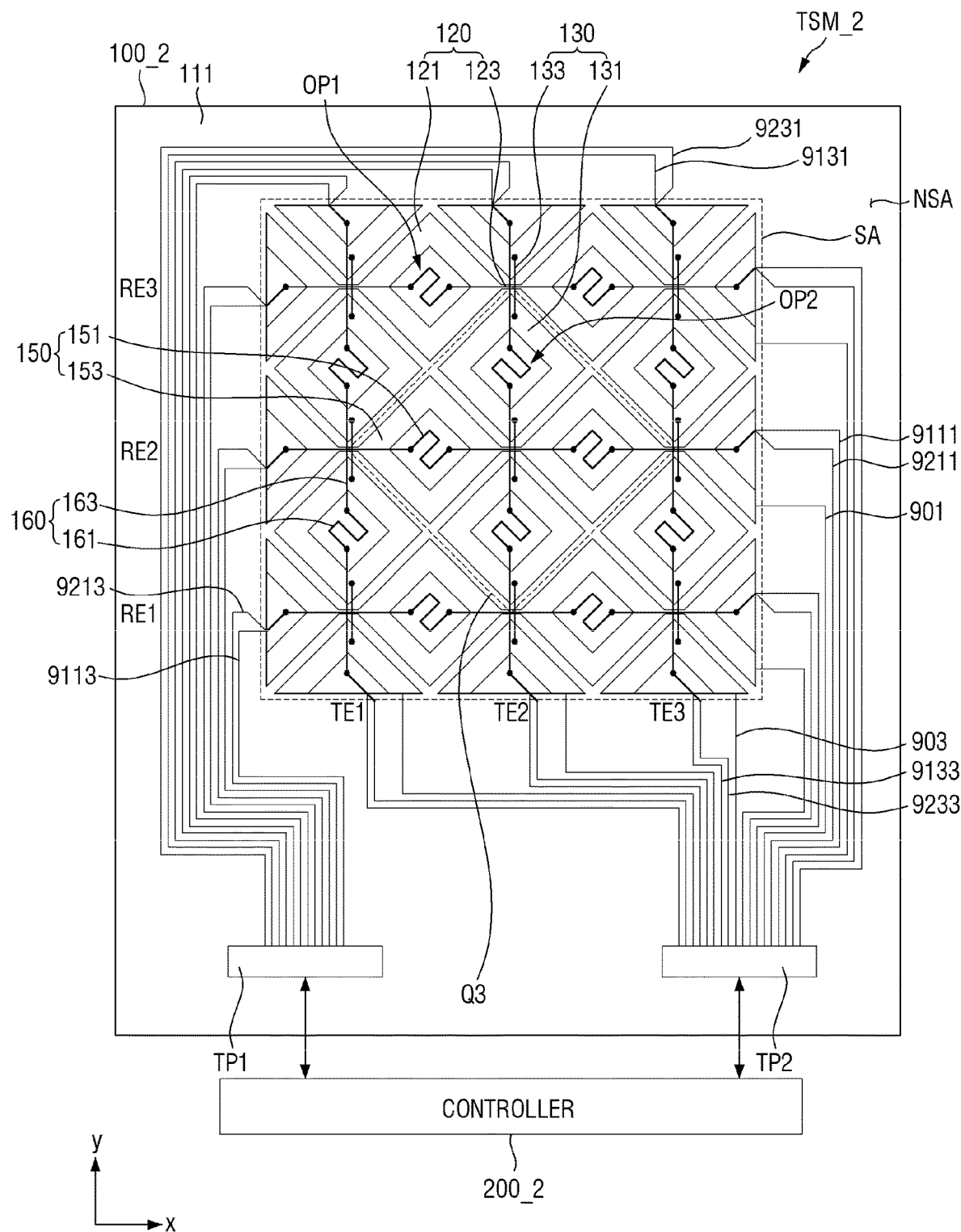
FIG. 30 is a plan view of a touch sensor according to another embodiment of the present disclosure.
Figure 31:
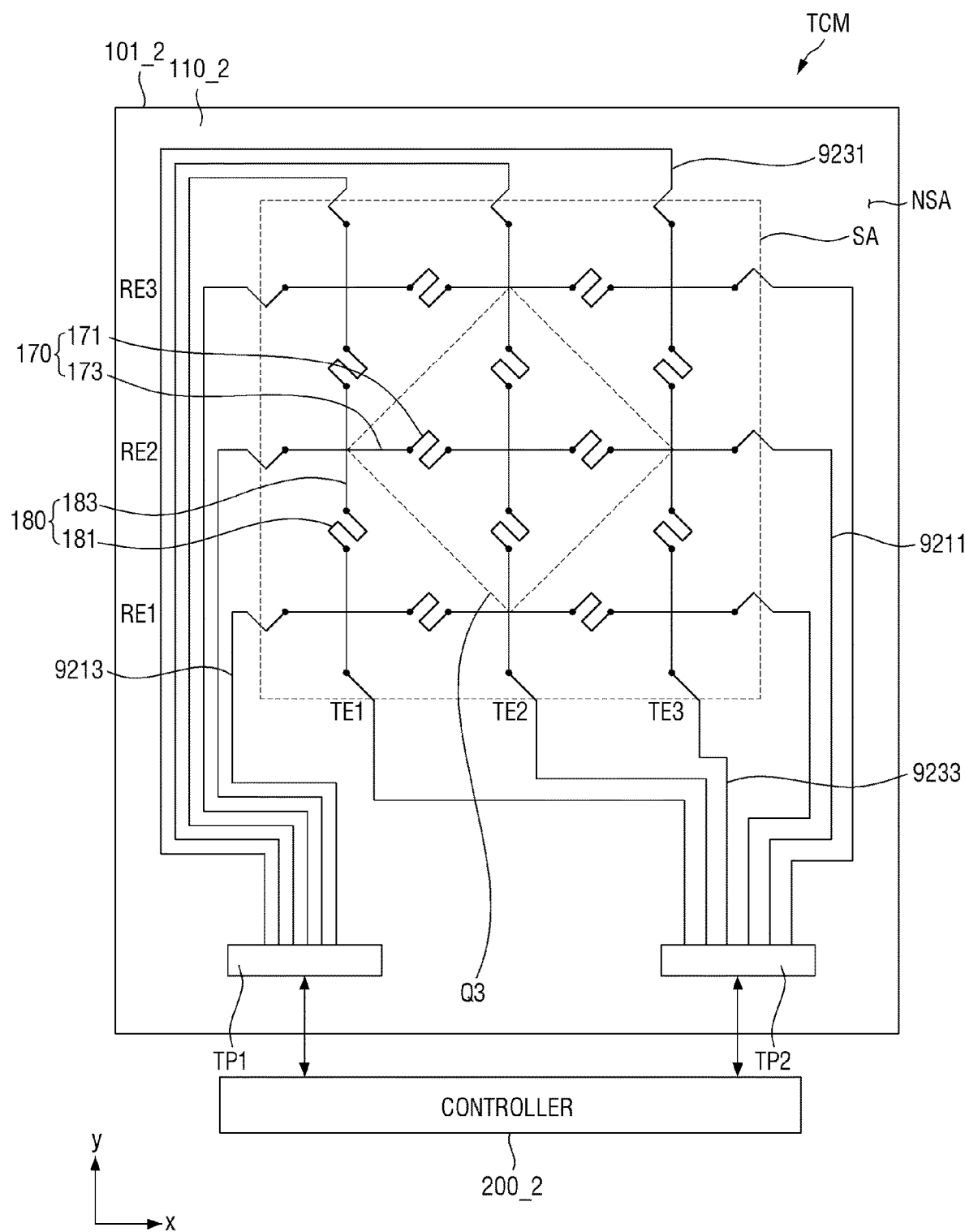
FIG. 31 is a plan view of a temperature compensation module of the touch sensor according to the exemplary embodiment of FIG. 30.
Figure 32:
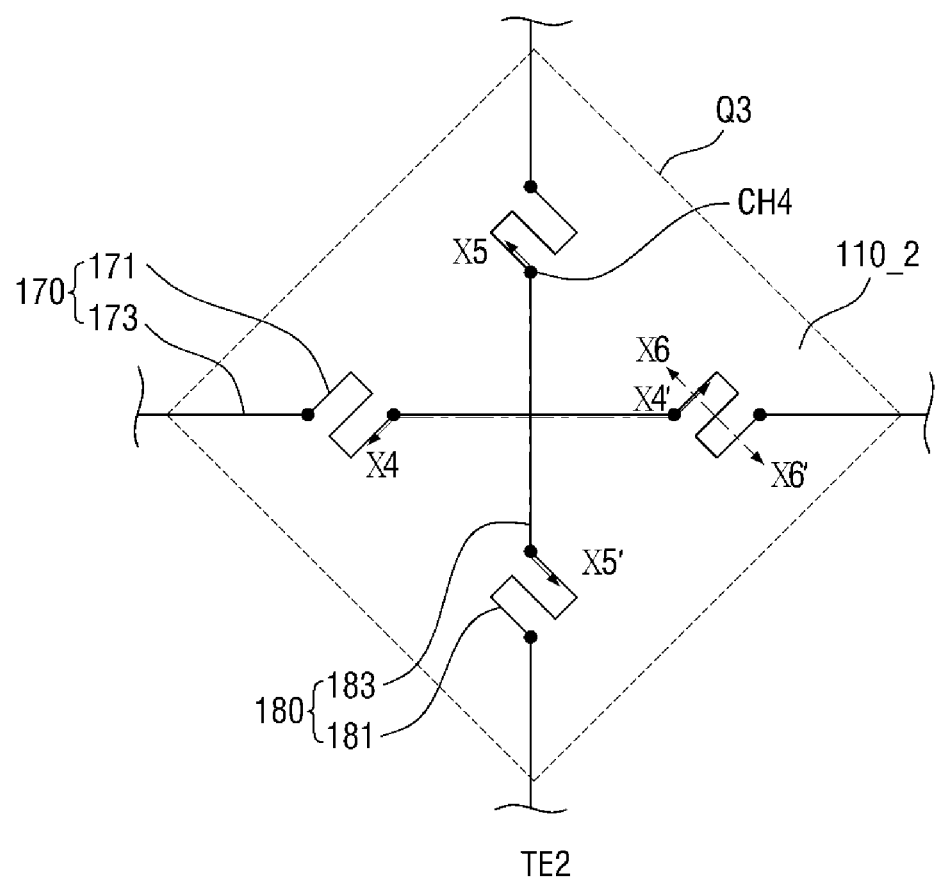
FIG. 32 is an enlarged plan view illustrating a part Q3 of FIG. 31.
Figure 33:
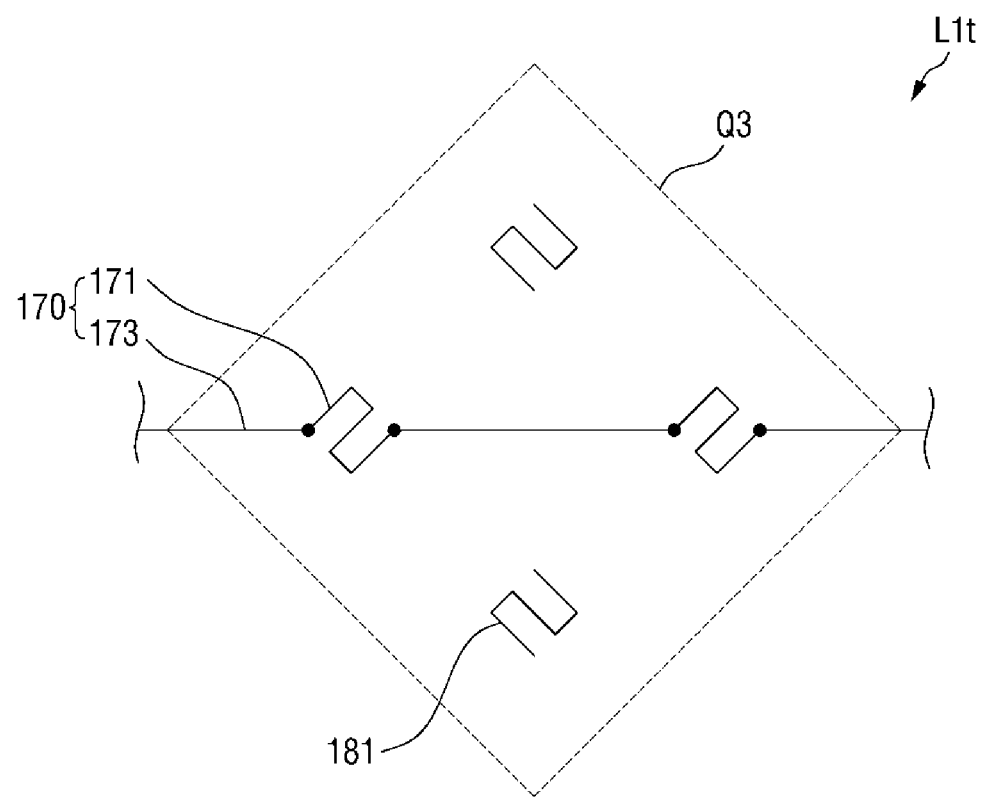
FIG. 33 is a schematic view illustrating a first layer of the temperature compensation module of FIG. 32.
Figure 34:
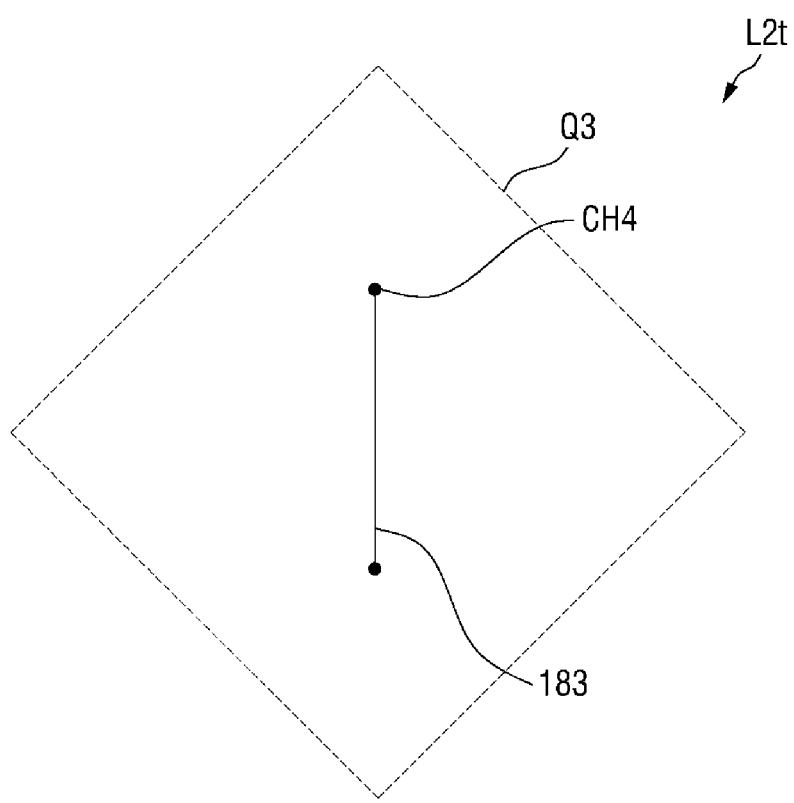
FIG. 34 is a schematic view illustrating a second layer of the temperature compensation module of FIG. 32.
Figure 35:
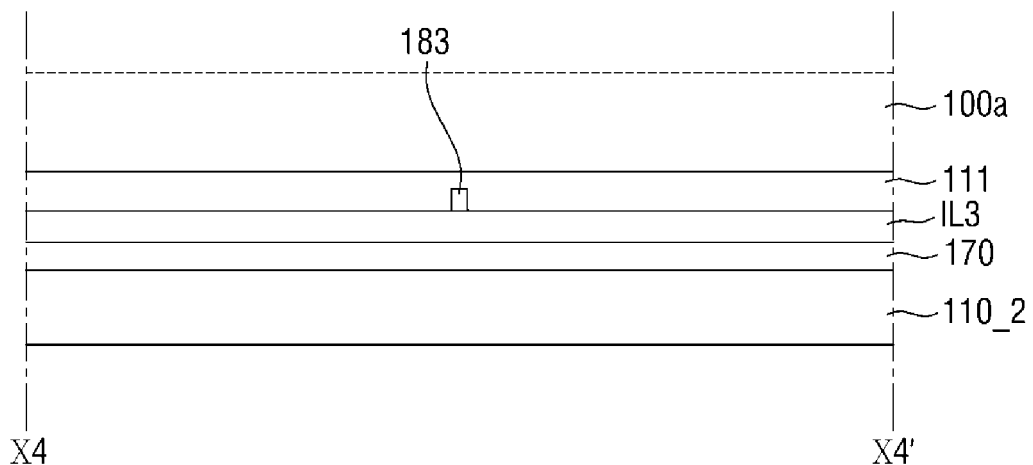
FIG. 35 is a cross-sectional view taken along a sectional line X4-X4' of FIG. 32.
Figure 36:
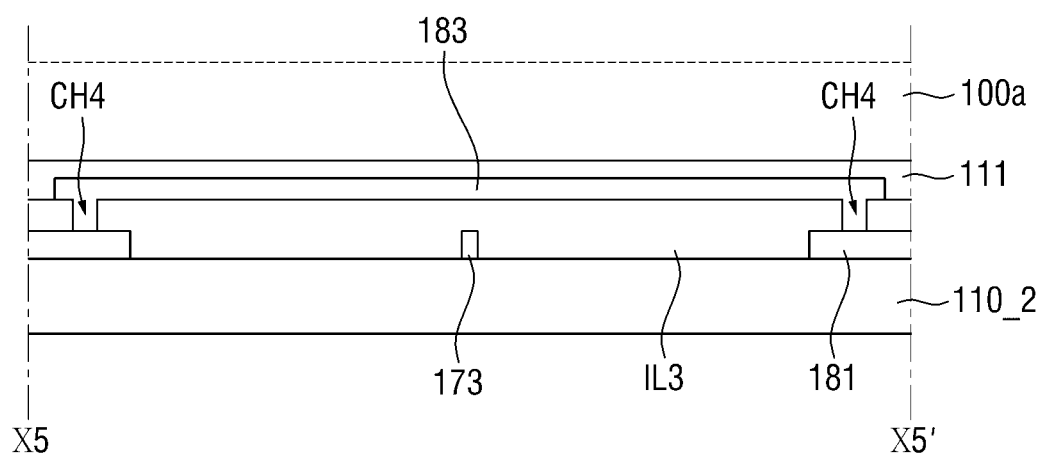
FIG. 36 is a cross-sectional view taken along a sectional line X5-X5' of FIG. 32.
Figure 37:
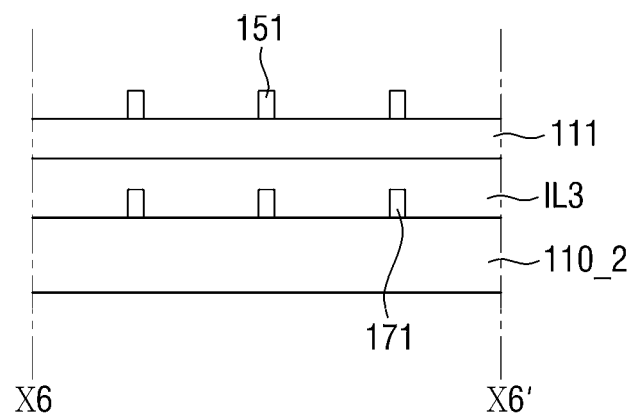
FIG. 37 is a cross-sectional view taken along a sectional line X6-X6' of FIG. 32.

FIG. 30 is a plan view of a touch sensor according to another embodiment of the present disclosure. FIG. 31 is a plan view of a temperature compensation module of the touch sensor according to the exemplary embodiment of FIG. 30. FIG. 32 is an enlarged plan view illustrating a part Q3 of FIG. 31. FIG. 33 is a schematic view illustrating a first layer of the temperature compensation module of FIG. 32. FIG. 34 is a schematic view illustrating a second layer of the temperature compensation module of FIG. 32. FIG. 35 is a cross-sectional view taken along a sectional line X4-X4' of FIG. 32. FIG. 36 is a cross-sectional view taken along a sectional line X5-X5' of FIG. 32. FIG. 37 is a cross-sectional view taken along a sectional line X6-X6' of FIG. 32.

Referring to FIGS. 30, 31, 32, 33, 34, 35, 36, and 37, a touch sensor TSM_2 includes a sensor module 100_2 and a controller 200_2. A temperature compensation module TSM includes a temperature compensator 101_2 and the controller 200_2.

The touch sensor TSM_2 differs from the touch sensor TSM of FIG. 4 in that it further includes the temperature compensator 101_2 and thus will hereinafter be described, focusing mainly on the difference(s) with the touch sensor TSM.

The temperature compensator 101_2 may be provided to overlap with the sensor module 100_2. An area in which the temperature compensator 101_1 can sense and compensate temperature may correspond to a sensing area SA in which the sensor module 100_2 can detect touch input. The temperature compensator 1012 may be disposed between a display panel (not illustrated) and the sensor module 100_2.

The temperature compensator 101_1 includes first temperature compensation patterns 170, second temperature compensation patterns 180, and temperature compensation signal lines (9211, 9213, 9231, and 9233).

In the sensing area SA of a first base layer 1102, the first temperature compensation patterns 170 and the second temperature compensation patterns 180, which are insulated from the first temperature compensation patterns 170, may be disposed. The first base layer 110_2 may be a TFE layer of the display panel.

The first temperature compensation patterns 170, like first strain gauges 150, may extend in a first direction x and may be spaced apart from one another in a second direction y. The first temperature compensation patterns 170, which are spaced apart from one another in the second direction y, may form temperature compensation pattern rows. FIG. 31 illustrates that three first temperature compensation patterns 170 are arranged along the second direction y to form three temperature compensation pattern rows along the second direction y, but the present disclosure is not limited thereto. That is, the number of first temperature compensation patterns 170 is not particularly limited but may vary depending on the number of first strain gauges 150.

The first temperature compensation patterns 170 may be disposed to correspond to the first strain gauges 150. The first temperature compensation patterns 170 may include first temperature compensation resistance lines 171 and first temperature compensation connecting lines 173.

The first temperature compensation resistance lines 171 may be disposed in a first lower layer L1t. The first temperature compensation resistance lines 171 may have the same shape as first resistance lines 151 of the first strain gauges 150. That is, the first temperature compensation resistance lines 171 may be formed into a predetermined bent shape to correspond to the first resistance lines 151, but the present disclosure is not limited thereto. In another example, the first temperature compensation resistance lines 171 may have a different shape from the first resistance lines 151. However, even if the first temperature compensation resistance lines 171 have a different shape from the first resistance lines 151, the first temperature compensation resistance lines 171 may have the same resistance as the first resistance lines 151.

The first temperature compensation connecting lines 173 may be disposed in the same layer as the first temperature compensation resistance lines 171, i.e., in the first lower layer L1t. The first temperature compensation connecting lines 173 may electrically connect pairs of adjacent first temperature compensation resistance lines 171 in the first direction x and may be in contact with the first temperature compensation resistance lines 171. The first temperature compensation connecting lines 173 may not be in contact with, but may be spaced apart and insulated from, second temperature compensation connecting lines 183 that will be described later.

The second temperature compensation patterns 180, like second strain gauges 160, may extend in the second direction y and may be spaced apart from one another in the first direction x. The second temperature compensation patterns 180, which are spaced apart from one another in the first direction x, may form temperature compensation pattern columns. FIG. 31 illustrates that three second temperature compensation patterns 180 are arranged along the first direction y to form three temperature compensation pattern columns along the first direction x, but the present disclosure is not limited thereto. That is, the number of second temperature compensation patterns 180 is not particularly limited but may vary depending on the number of second strain gauges 160.

The second temperature compensation patterns 180 may be disposed to correspond to the second strain gauges 160. The second temperature compensation patterns 180 may include second temperature compensation resistance lines 181 and the second temperature compensation connecting lines 183.

The second temperature compensation resistance lines 181 may be disposed in the same layer as the first temperature compensation resistance lines 171 and the first temperature compensation connecting lines 173, i.e., in the first lower layer L1t. The second temperature compensation resistance lines 181 may have the same shape as second resistance lines 161 of the second strain gauges 160. That is, the second temperature compensation resistance lines 181 may be formed into a predetermined bent shape to correspond to the second resistance lines 161, but the present disclosure is not limited thereto. In another example, the second temperature compensation resistance lines 181 may have a different shape from the second resistance lines 161. However, even if the second temperature compensation resistance lines 181 have a different shape from the second resistance lines 161, the second temperature compensation resistance lines 181 may have the same resistance as the second resistance lines 161.

The second temperature compensation connecting lines 183 may electrically connect pairs of adjacent second temperature compensation resistance lines 181 in the second direction y and may be in contact with the second temperature compensation resistance lines 181.

A third insulating layer IL3 may be disposed between the second temperature compensation resistance lines 181 and the second temperature compensation connecting lines 183, and the second temperature compensation resistance lines 181 and the second temperature compensation connecting lines 183 may be in contact with each other via fourth contact holes CH4, which are formed in the third insulating layer IL3.

The first temperature compensation connecting lines 173 may be disposed between the first base layer 110_2 and the second temperature compensation connecting lines 183, but the present disclosure is not limited thereto. In another example, the first temperature compensation connecting lines 173 may be disposed between the first base layer 110_2 and the second temperature compensation connecting lines 183.

A second base layer 111 may be disposed on the first temperature compensation patterns 170 and the second temperature compensation patterns 180.

The second base layer 111 may provide a space in which a sensing pattern 100a of the sensor module 1002 is disposed. Here, not only the sensing pattern 100a of FIGS. 13, 14 and 15, but also the sensing pattern 100a_1 of FIGS. 20, 21, and 22, can be used as the sensing pattern 100a. That is, first electrode members 120, second electrode members 130, the first strain gauges 150, and the second strain gauges 160 may be disposed on the second base layer 111.

The second base layer 111 may be formed as a multilayer film consisting of at least one organic film and at least one inorganic film or as a single-layer film including organic and inorganic materials.

In a peripheral area NSA of the first base layer 1102, the temperature compensation signal lines (9211, 9213, 9231, and 9233) may be further disposed.

The temperature compensation signal lines (9211, 9213, 9231, and 9233) may include first temperature compensation signal lines 9211 connected to first ends of the first temperature compensation patterns 170 and second temperature compensation signal lines 9213 connected to second ends of the first temperature compensation patterns 170 and may further include third temperature compensation signal lines 9231 connected to first ends of the second temperature compensation patterns 180 and fourth temperature compensation signal lines 9233 connected to second ends of the second temperature compensation patterns 180.

The temperature compensation signal lines (9211, 9213, 9231, and 9233) may be connected to pad members (TP1 and TP2) and may transmit signals to the controller 200_2. For example, FIGS. 30 and 31 illustrate that the second temperature compensation signal lines 9213 and the third temperature compensation signal lines 9231 are connected to a first pad member TP1, and that the first temperature compensation signal lines 9211 and the fourth temperature compensation signal lines 8233 are connected to a second pad member TP2.

In response to touch input from a user being applied to the touch sensor TSM_2, the resistance of the first strain gauges 150 may change in accordance with the magnitude of the touch input. Also, as the body temperature of the user or the temperature of the display panel changes, the resistance of the first strain gauges 150 may change. Resistance variations in the first strain gauges 150 caused by temperature variations are irrelevant to the magnitude of touch input from the user and may thus serve as noise.

The first temperature compensation patterns 170 may be disposed below the first strain gauges 150 to correspond to the first strain gauges 150. In response to touch input from the user being applied to the touch sensor TSM_2, the resistance of the first strain gauges 150 changes because of the body temperature of the user or the temperature of the display panel, and the resistance of the first temperature compensation patterns 170 also change because of heat from the body of the user or the display panel. Accordingly, resistance variations in the first strain gauges 150 caused by temperature variations can be compensated for using resistance variations in the first temperature compensation patterns 170 caused by temperature variations.

Figure 38:
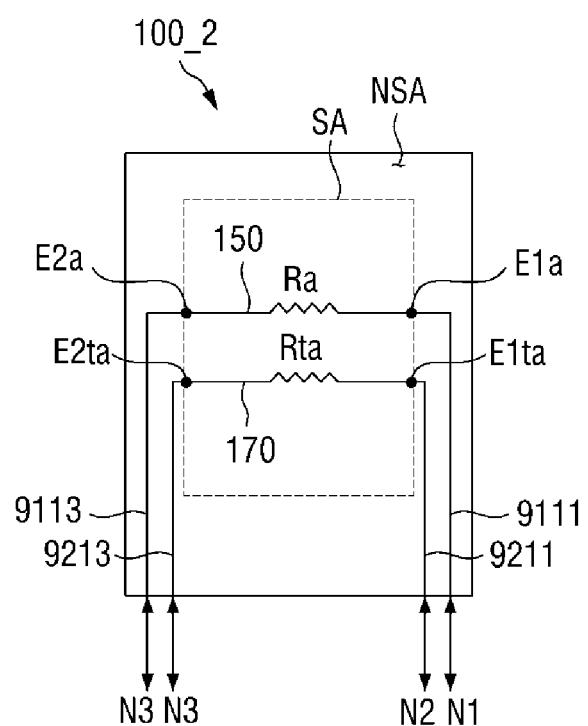
FIG. 38 is a circuit diagram illustrating an equivalent circuit of a first strain gauge, a first temperature compensation pattern, and signal lines of a touch sensor according to another embodiment of the present disclosure for explaining how the first strain gauge and the first temperature compensation pattern are connected to a first Wheatstone bridge circuit.
Figure 39:
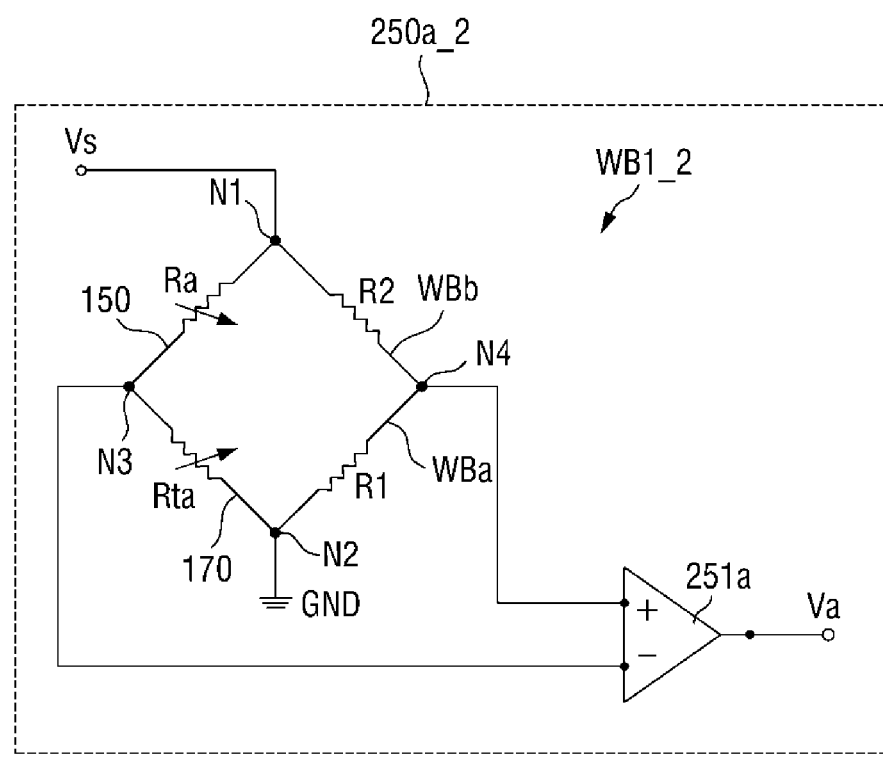
FIG. 39 is a circuit diagram illustrating an equivalent circuit of a first Wheatstone bridge circuit to which the first strain gauge and the first temperature compensation pattern of FIG. 38 are electrically connected.
Figure 40:
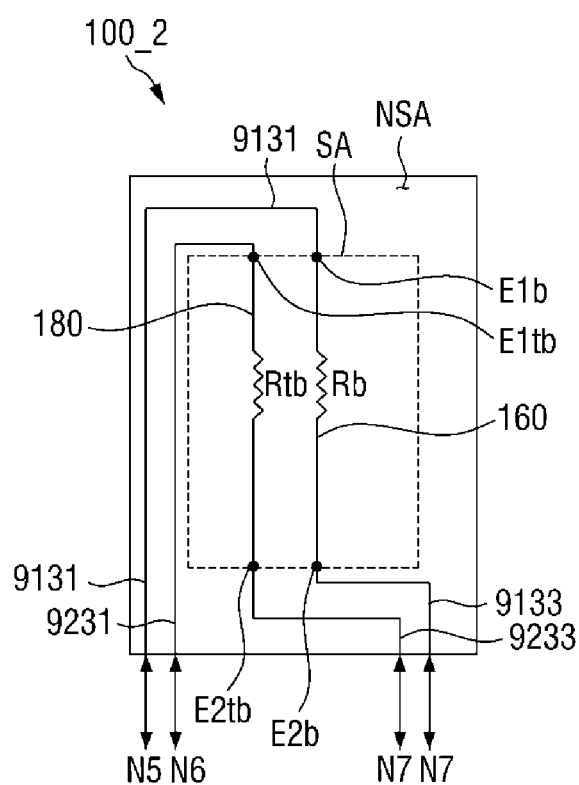
FIG. 40 is a circuit diagram illustrating an equivalent circuit of a second strain gauge, a second temperature compensation pattern, and signal lines of a touch sensor according to another embodiment of the present disclosure for explaining the second strain gauge and the second temperature compensation pattern are connected to a second Wheatstone bridge circuit.
Figure 41:
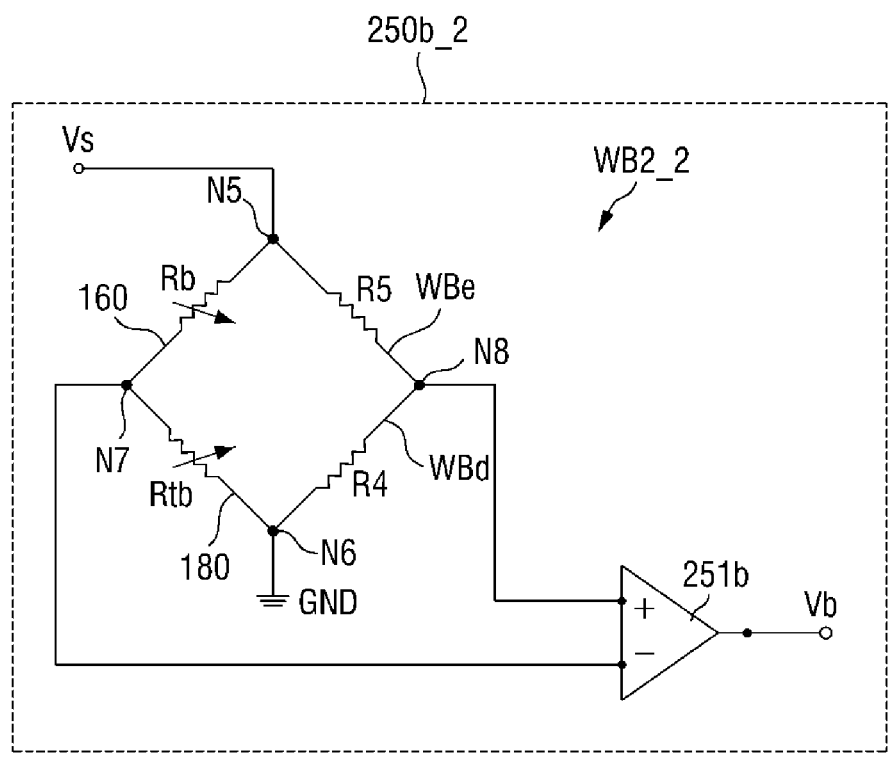
FIG. 41 is a circuit diagram illustrating an equivalent circuit of a second Wheatstone bridge circuit to which the second strain gauge and the second temperature compensation pattern of FIG. 40 are electrically connected.

FIG. 38 is a circuit diagram illustrating an equivalent circuit of a first strain gauge, a first temperature compensation pattern, and signal lines of a touch sensor according to another embodiment of the present disclosure explaining the first strain gauge and the first temperature compensation pattern are connected to a first Wheatstone bridge circuit. FIG. 39 is a circuit diagram illustrating an equivalent circuit of a first Wheatstone bridge circuit to which the first strain gauge and the first temperature compensation pattern of FIG. 38 are electrically connected. FIG. 40 is a circuit diagram illustrating an equivalent circuit of a second strain gauge, a second temperature compensation pattern, and signal lines of a touch sensor according to another embodiment of the present disclosure for explaining the second strain gauge and the second temperature compensation pattern are connected to a second Wheatstone bridge circuit. FIG. 41 is a circuit diagram illustrating an equivalent circuit of a second Wheatstone bridge circuit to which the second strain gauge and the second temperature compensation pattern of FIG. 40 are electrically connected.

A controller 200_2 of FIGS. 38 and 39 is substantially the same as, or similar to, the controller 200 of FIG. 4 except that a first Wheatstone bridge circuit module WB1_2 of a first pressure detector 250a_2 includes a first temperature compensation pattern 170.

The first pressure detector 250a2 may include the first Wheatstone bridge circuit module WB1_2. The first Wheatstone bridge circuit module WB12 is substantially the same as, or at least similar to, the first Wheatstone bridge circuit module WB1 of FIG. 27 except that it includes the first temperature compensation pattern 170, and thus, a detailed description thereof will be omitted.

A first end E1a of a first strain gauge 150 may be electrically connected to a first node N1 via a first signal line 9111, and a second end E2a of the first strain gauge 150 may be connected to a first output node N3 via a second signal line 9113.

A first end E1ta of the first temperature compensation pattern 170 may be connected to a second node N2 via a first temperature compensation signal line 9211, and a second end E2ta of the first temperature compensation pattern 170 may be connected to a first output node N3 via a second temperature compensation signal line 9213.

The first strain gauge 150, the first temperature compensation pattern 170, a first resistor WBa, and a second resistor WBb may be connected to one another to form a Wheatstone bridge.

In some exemplary embodiments, when touch input is yet to be applied, the product of a resistance Ra of the first strain gauge 150 and a resistance R1 of the first resistor WBa may be substantially the same as the product of a resistance Rta of the first temperature compensation pattern 170 and a resistance R2 of the second resistor WBb.

The resistance Ra of the first strain gauge 150 includes a first pressure resistance component that varies as the first strain gauge 150 is deformed in response to touch input being generated and a first temperature resistance component that varies in accordance with a temperature variation. The resistance Rta of the first temperature compensation pattern 170 includes a second pressure resistance component that varies as the first temperature compensation pattern 170 is deformed in response to touch input being generated and a second temperature resistance component that varies in accordance with a temperature variation. The second pressure resistance component may be negligible or may be significantly different from the first pressure resistance component. Since the first strain gage 150 and the first temperature compensation pattern 170 are arranged in the first Wheatstone bridge circuit module WB1_2 not to face each other in a diagonal direction, the second temperature resistance component of the first temperature compensation pattern 170 can compensate or offset the first temperature resistance component of the first strain gauge 150, and as a result, touch pressure can be detected sensitively.

Referring to FIGS. 40 and 41, a controller 200_2 is substantially the same as, or similar to, the controller 200 of FIG. 4 except that a second Wheatstone bridge circuit module WB2_2 of a second pressure detector 250b_2 includes a second temperature compensation pattern 180.

The second pressure detector 250b_2 may include the second Wheatstone bridge circuit module WB2_2. The second Wheatstone bridge circuit module WB2_2 is substantially the same as, or at least similar to, the second Wheatstone bridge circuit module WB2 of FIG. 28 except that it includes the second temperature compensation pattern 180, and thus, a detailed description thereof will be omitted.

A first end E1*b* of a second strain gauge 160 may be electrically connected to a third node N5 via a second signal line 9131, and a second end E2*b* of the second strain gauge 160 may be connected to a third output node N7 via a second signal line 9133.

A first end E1*tb* of the second temperature compensation pattern 180 may be connected to a fourth node N6 via a second temperature compensation signal line 9231, and a second end E2*tb* of the second temperature compensation pattern 180 may be connected to a third output node N7 via a second temperature compensation signal line 9233.

The second strain gauge 160, the second temperature compensation pattern 180, a fourth resistor WBd, and a fifth resistor WBe may be connected to one another to form a Wheatstone bridge.

In some exemplary embodiments, when touch input is yet to be applied, the product of a resistance Rb of the second strain gauge 160 and a resistance R4 of the fourth resistor WBd may be substantially the same as the product of a resistance Rtb of the second temperature compensation pattern 180 and a resistance R5 of the fifth resistor WBe.

The resistance Rb of the second strain gauge 160 includes a third pressure resistance component that varies as the second strain gauge 160 is deformed in response to touch input being generated and a third temperature resistance component that varies in accordance with a temperature variation. The resistance Rtb of the second temperature compensation pattern 180 includes a fourth pressure resistance component that varies as the second temperature compensation pattern 180 is deformed in response to touch input being generated and a fourth temperature resistance component that varies in accordance with a temperature variation. The fourth pressure resistance component may be negligible or may be significantly different from the third pressure resistance component. Since the second strain gage 160 and the second temperature compensation pattern 180 are arranged in the second Wheatstone bridge circuit module WB2_2 not to face each other in a diagonal direction, the fourth temperature resistance component of the second temperature compensation pattern 180 can compensate or offset the third temperature resistance component of the second strain gauge 160, and as a result, touch pressure can be detected more accurately.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensor comprising:
   a base layer;
   a first electrode member comprising first touch electrodes as driving electrodes arranged on the base layer along a first direction and electrically connected to one another in the first direction, the first touch electrodes comprising first openings;
   a second electrode member comprising second touch electrodes as sensing electrodes arranged on the base layer along a second direction intersecting the first direction and electrically connected to one another in the second direction, the second touch electrodes comprising second openings;
   a first strain gauge comprising first resistance lines disposed in the first openings and electrically connected to one another in the first direction, the first resistance lines being horizontally adjacent to the first touch electrodes; and
   a second strain gauge comprising second resistance lines, which are disposed in the second openings and electrically connected to one another in the second direction, the second resistance lines being horizontally adjacent to the second touch electrodes,
   wherein the first electrode member is insulated from the second electrode member, and
   wherein the first strain gauge is insulated from the second strain gauge.

2. The touch sensor of claim 1, wherein the first electrode member further comprises first connectors respectively connecting pairs of adjacent first touch electrodes in the first direction,
   wherein the second electrode member further comprises second connectors respectively connecting pairs of adjacent second touch electrodes in the second direction, and
   wherein the first connectors and the second connectors are disposed in different layers.

3. The touch sensor of claim 2, wherein the first strain gauge further comprises first connecting lines respectively connecting pairs of adjacent first resistance lines in the first direction,
   wherein the second strain gauge further comprises second connecting lines respectively connecting pairs of adjacent second resistance lines in the second direction and insulated from the first connecting lines,
   wherein the first connecting lines and the second connecting lines are disposed in different layers, and
   wherein the first connecting lines are disposed between the first connectors and the second connecting lines and between the first connectors and the second connectors.

4. The touch sensor of claim 3, wherein:
   the second connectors are disposed in the same layer as the second connecting lines, and
   the second connectors and the second connecting lines are horizontally adjacent to each other.

5. The touch sensor of claim 4, wherein the first touch electrodes and the second touch electrodes comprise a metal mesh structure.

6. The touch sensor of claim 5, further comprising:
   a first insulating layer disposed between the first connectors and the second connectors; and
   a second insulating layer disposed between the first connecting lines and the second connecting lines.

7. The touch sensor of claim 1, further comprising:
   a temperature compensation circuit disposed between the base layer and the first strain gauge, the temperature compensation circuit comprising a first temperature compensation pattern and a second temperature compensation pattern,
   wherein the first temperature compensation pattern is insulated from the second temperature compensation pattern.

8. The touch sensor of claim 7, wherein the first temperature compensation pattern overlaps with the first strain gauge in a plan view and comprises first temperature compensation resistance lines having the same shape as the overlapping first resistance lines, and
   wherein the second temperature compensation pattern overlaps with the second strain gauge in the plan view and comprises second temperature compensation resistance lines having the same shape as the overlapping second resistance lines.

9. The touch sensor of claim 1, wherein the touch sensor is configured to:
   detect a location of touch input based on mutual capacitance variations between the first touch electrodes and the second touch electrodes generated in response to the touch input and
   detect a pressure and the location of the touch input based on resistance variations in the first and second strain gauges generated in response to the touch input.

10. The touch sensor of claim 9, further comprising:
    a first Wheatstone bridge circuit electrically connected to the first strain gauge; and
    a second Wheatstone bridge circuit electrically connected to the second strain gauge.

11. The touch sensor of claim 10, wherein the first Wheatstone bridge circuit comprises: a first output node; a second output node; a first node to which a driving voltage is applied; and a second node which is connected to a ground source,
    wherein the second Wheatstone bridge circuit comprises: a third output node; a fourth output node; a third node to which a driving voltage is applied; and a fourth node which is connected to the ground source,
    wherein the first strain gauge is electrically connected between the first node and the first output node, and
    wherein the second strain gauge is electrically connected between the third node and the third output node.

12. The touch sensor of claim 9, further comprising:
    a temperature compensation circuit comprising: first temperature compensation pattern overlapping the first strain gauge; and second temperature compensation pattern overlapping the second strain gauge;
    a first Wheatstone bridge circuit comprising: a first output node; a second output node; a first node to which a driving voltage is applied; and a second node which is connected to a ground source; and
    a second Wheatstone bridge circuit comprising: a third output node; a fourth output node; a third node to which a driving voltage is applied; and a fourth node which is connected to the ground source,
    wherein the first strain gauge is electrically connected between the first node and the first output node,
    wherein the second strain gauge is electrically connected between the third node and the third output node,
    wherein the first temperature compensation pattern is electrically connected between the second node and the first output node, and
    wherein first temperature compensation pattern is electrically connected between the fourth node and the third output node.

13. The touch sensor of claim 12, wherein when the touch input is yet to be applied, a resistance of the first temperature compensation pattern is the same as a resistance of the first strain gauge, and a resistance of the second temperature compensation pattern is the same as a resistance of the second strain gauge.

14. A touch sensor comprising:
    a first base layer;
    a first electrode member comprising first touch electrodes as driving electrodes arranged on the first base layer along a first direction and electrically connected to one another in the first direction, the first touch electrodes comprising first openings;
    a second electrode member comprising second touch electrodes as sensing electrodes arranged on the first base layer along a second direction intersecting the first direction and electrically connected to one another in the second direction, the second touch electrode comprising second openings;
    a first strain gauge comprising first resistance lines disposed in the first openings and electrically connected to one another in the first direction, the first resistance lines being horizontally adjacent to the first touch electrodes;
    a second strain gauge comprising second resistance lines, which are disposed in the second openings and electrically connected to one another in the second direction, the second resistance lines being horizontally adjacent to the second touch electrodes; and
    a first temperature compensation pattern disposed between the first base layer and the first strain gauge,
    wherein the first temperature compensation pattern overlaps with the first strain gauge in a plan view, and
    wherein the first temperature compensation pattern is formed of the same material as the first strain gauge.

15. The touch sensor of claim 14, further comprising:
    a second base layer disposed between the first strain gauge and the first temperature compensation pattern,
    wherein the first temperature compensation pattern is disposed between the first and second base layers.

16. The touch sensor of claim 15, further comprising:
    a second temperature compensation pattern disposed between the first base layer and the second strain gauge,
    wherein the second strain gauge is insulated from the first strain gauge, and
    wherein the second temperature compensation pattern is insulated from the first temperature compensation pattern.

17. The touch sensor of claim 16, further comprising:
    an insulating layer disposed between the first and second temperature compensation patterns.

18. A display device comprising:
    a base substrate;
    a light-emitting element disposed on the base substrate;
    a thin-film encapsulation layer disposed on the light-emitting element;
    first touch electrodes as driving electrodes disposed on the thin-film encapsulation layer and electrically connected to one another along a first direction, the first touch electrodes comprising first openings;
    second touch electrodes as sensing electrodes disposed on the thin-film encapsulation layer and electrically connected to one another along a second direction intersecting the first direction, the second touch electrodes comprising second openings;
    first resistance lines disposed in the first openings and electrically connected to one another in the first direction, the first resistance line being horizontally adjacent to the first touch electrodes; and
    second resistance lines disposed in the second openings and electrically connected to one another in the second direction, the second resistance lines being horizontally adjacent to the second touch electrodes,
    wherein the first touch electrodes are insulated from the second touch electrodes, and
    wherein the first resistance lines are insulated from the second resistance lines.

19. The display device of claim 18, wherein the thin-film encapsulation layer comprises a first inorganic film, an organic film disposed on the first inorganic film, and a second inorganic film disposed on the organic film, and wherein the first touch electrodes, the second touch electrodes, the first resistance lines, and the second resistance lines are disposed on the second inorganic film.

20. The display device of claim 19, further comprising:
a temperature compensation circuit disposed between the thin-film encapsulation layer and the first resistance lines, the temperature compensation circuit comprising:
   first temperature compensation patterns having the same shape as the first resistance lines; and
   second temperature compensation patterns having the same shape as the second resistance lines,
wherein the first and second temperature compensation patterns are formed of the same material as the first resistance lines.

* * * * *